(12) United States Patent
Seidel et al.

(10) Patent No.: US 7,657,815 B2
(45) Date of Patent: Feb. 2, 2010

(54) TIME MONITORING OF PACKET RETRANSMISSIONS DURING SOFT HANDOVER

(75) Inventors: Eiko Seidel, Darmstadt (DE); Joachim Lohr, Darmstadt (DE); Dragan Petrovic, Darmstadt (DE)

(73) Assignee: Panasonic Corporation, Osaka (JP)

( * ) Notice: Subject to any disclaimer, the term of this patent is extended or adjusted under 35 U.S.C. 154(b) by 329 days.

(21) Appl. No.: 10/567,825

(22) PCT Filed: Jun. 17, 2004

(86) PCT No.: PCT/EP2004/006559

§ 371 (c)(1),
(2), (4) Date: Sep. 18, 2006

(87) PCT Pub. No.: WO2005/018241

PCT Pub. Date: Feb. 24, 2005

(65) Prior Publication Data

US 2007/0079207 A1    Apr. 5, 2007

(30) Foreign Application Priority Data

Aug. 14, 2003    (EP)    ................................. 03018470

(51) Int. Cl.
*H04L 1/18* (2006.01)
(52) U.S. Cl. ...................... 714/748; 370/229
(58) Field of Classification Search .......... 714/748–751
See application file for complete search history.

(56) References Cited

U.S. PATENT DOCUMENTS

| | | | |
|---|---|---|---|
| 6,557,134 B2 | 4/2003 | Bims et al. | |
| 6,850,769 B2 | 2/2005 | Grob et al. | |
| 6,901,063 B2 * | 5/2005 | Vayanos et al. | ............. 370/335 |
| 2002/0019965 A1 | 2/2002 | Bims et al. | |

(Continued)

FOREIGN PATENT DOCUMENTS

JP    2001-217774    8/2001

(Continued)

OTHER PUBLICATIONS

PCT International Search Report dated May 17, 2005.

(Continued)

*Primary Examiner*—Esaw T Abraham
(74) *Attorney, Agent, or Firm*—Dickinson Wright PLLC

(57) ABSTRACT

The present invention relates to a method for scheduling data retransmissions, a method for use in a data retransmission scheme and a method for updating a soft buffer of a base station in a mobile communication system during a soft-handover. The present invention relates to a base station executing the controlling and updating method, a communication terminal for executing the scheduling method and to a mobile communication system comprising at least one the base station and communication terminal. To prevent erroneous combining of data packets in a packet retransmission scheme at the receiver, the present invention provides a method that may flush the soft buffer region associated to a received data packet upon its correct reception. Further, a method is provided that monitors the time elapsed since the last storing of a data packet in a buffer region of a base station to be able to trigger the flush of the buffer region upon expiry of a threshold time period.

40 Claims, 11 Drawing Sheets

U.S. PATENT DOCUMENTS

| | | | |
|---|---|---|---|
| 2002/0172217 | A1 | 11/2002 | Kadaba et al. |
| 2003/0214906 | A1* | 11/2003 | Hu et al. .................... 370/231 |
| 2004/0116143 | A1 | 6/2004 | Love et al. |

FOREIGN PATENT DOCUMENTS

| | | |
|---|---|---|
| JP | 2002 369261 | 12/2002 |
| WO | 02/037872 | 5/2002 |
| WO | 0237872 | 5/2002 |
| WO | 03017691 | 2/2003 |

OTHER PUBLICATIONS

"UTRAN Overall Description," 3GPP TS 25.401 v6.1.0, Release 6 Technical Specification, $3^{rd}$ Generation Partnership Project, Technical Specification Group Radio Access Network, www.3gpp.org, pp. 1-44, Jun. 2003.

"Feasibility Study on the Evolution of UTRAN Architecture," 3GPP TR 25.897v0.2.1, Release 6, Technical Report, $3^{rd}$ Generation Partnership Project, Technical Specification Group Radio Access Network, www.3gpp.org, pp. 1-16, Jun. 2006.

"Proposed Architecture for UTRAN Evolution," 3GPP TSG-RAN WG3 Meeting #36, Tdoc R3-030678, Siemens, 3 pages total, May 19-23, 2003.

"Further Clarifications on the Presented Evolved Architecture," 3GPP TSG-RAN WG3 Meeting #36, R3030688, Nokia, 4 pages total, Apr. 7-11, 2003.

"Feasibility Study for Enhanced Uplink for UTRA FDD" 3GPP TR 25.896 v6.0.0, Release 6, Technical Report, $3^{rd}$ Generation Partnership Project, Technical Specification Group Radio Access Network, www.3gpp.org, pp. 1-179, Mar. 2004.

"HARQ Structure," 3GPP TSG-RAN WG1 #31 Meeting, Tdoc R1-030247, Samsung Electronics, 3 pages total, Feb. 18-21, 2003.

"Requirements for Support of Radio Resource Management (FDD)," Release 6, 3GPP TS 25.133v6.2.0, Technical Specification, $3^{rd}$ Generation Partnership Project, Technical Specification Group Radio Access Network, www.3gpp.org, pp. 1-162, Jun. 2003.

"Radio Resource Control (RRC) Protocol Specification," Release 6, 3GPP TS 25.331 v5.5.0, Technical Specification, $3^{rd}$ Generation Partnership Project, (FDD) Technical Specification Group Radio Access Network, www.3gpp.org, pp. 1-994, Jun. 2003.

International Search Report dated May 17, 2005 and Written Opinion of the International Searching Authority.

Japanese Office Action dated Oct. 24, 2006 with English translation.

Office Action dated Oct. 20, 2009, in corresponding Japanese Patent Application w/ English translation.

* cited by examiner

TIME MONITORING OF PACKET RETRANSMISSIONS DURING SOFT HANDOVER

The present invention relates to a method for scheduling data retransmissions and a method for use in a packet retransmission scheme in a communication terminal being part of a mobile communication system comprising said communication terminal and a plurality of base stations, wherein said communication terminal is in communication with said plurality of base stations during a soft handover. Moreover the present invention relates to a method for updating a soft buffer of a base station being part of the mobile communication terminal. Further the present invention relates to a base station executing the method for controlling data retransmissions and a communication terminal executing the method for scheduling data retransmissions. Finally, the present invention relates to a mobile communication system comprising at least one the base station and at least one communication terminal.

TECHNICAL BACKGROUND

W-CDMA (wideband Code Division Multiple Access) is a radio interface for IMT-2000 (International Mobile Communication), which was standardized for use as the $3^{rd}$ generation wireless mobile telecommunication system. It provides a variety of services such as voice services and multimedia mobile communication services in a flexible and efficient way. The standardization bodies in Japan, Europe, USA, and other countries have jointly organized a project called the $3^{rd}$ Generation Partnership Project (3GPP) to produce common radio interface specifications for W-CDMA.

The standardized European version of IMT-2000 is commonly called UMTS (Universal Mobile Telecommunication System). The first release of the specification of UMTS has been published in 1999 (Release 99). In the mean time several improvements to the standard have been standardized by the 3GPP in Release 4 and Release 5 and discussion on further improvements is ongoing under the scope of Release 6.

The dedicated channel (DCH) for downlink and uplink and the downlink shared channel (DSCH) have been defined in Release 99 and Release 4. In the following years, the developers recognized that for providing multimedia services—or data services in general—high speed asymmetric access had to be implemented. In Release 5 the high-speed downlink packet access (HSDPA) was introduced. The new high-speed downlink shared channel (HS-DSCH) provides downlink high-speed access to the user from the UMTS Radio Access Network (RAN) to the communication terminals, called user equipments in the UMTS specifications.

HSDPA is based on techniques such as fast packet scheduling, adaptive modulation and hybrid ARQ (HARQ) to achieve high throughput, reduce delay and achieve high peak data rates.

Hybrid Arq Schemes

The most common technique for error detection of non-real time services is based on Automatic Repeat reQuest (ARQ) schemes, which are combined with Forward Error Correction (FEC), called Hybrid ARQ. If Cyclic Redundancy Check (CRC) detects an error, the receiver requests the transmitter to send additional bits or a new data packet. From different existing schemes the stop-and-wait (SAW) and selective-repeat (SR) continuous ARQ are most often used in mobile communication.

A data unit will be encoded before transmission. Depending on the bits that are retransmitted three different types of ARQ may be defined.

In HARQ Type I the erroneous data packets received, also called PDUs (Packet Data Unit) are discarded and new copy of that PDU is retransmitted and decoded separately. There is no combining of earlier and later versions of that PDU. Using HARQ Type II the erroneous PDU that needs to be retransmitted is not discarded, but is combined with some incremental redundancy bits provided by the transmitter for subsequent decoding. Retransmitted PDU sometimes have higher coding rates and are combined at the receiver with the stored values. That means that only little redundancy is added in each retransmission.

Finally, HARQ Type III is almost the same packet retransmission scheme as Type II and only differs in that every retransmitted PDU is self-decodable. This implies that the PDU is decodable without the combination with previous PDUs. In case some PDUs are so heavily damaged that almost no information is reusable self decodable packets can be advantageously used.

UMTS Architecture

The high level R99/4/5 architecture of Universal Mobile Telecommunication System (UMTS) is shown in FIG. 1 (see 3GPP TR 25.401: "UTRAN Overall Description", available from http://www.3gpp.org). The network elements are functionally grouped into the Core Network (CN) 101, the UMTS Terrestrial Radio Access Network (UTRAN) 102 and the User Equipment (UE) 103. The UTRAN 102 is responsible for handling all radio-related functionality, while the CN 101 is responsible for routing calls and data connections to external networks. The interconnections of these network elements are defined by open interfaces (Iu, Uu). It should be noted that UMTS system is modular and it is therefore possible to have several network elements of the same type.

FIG. 2 illustrates the current architecture of UTRAN. A number of Radio Network Controllers (RNCs) 201, 202 are connected to the CN 101. Each RNC 201, 202 controls one or several base stations (Node Bs) 203, 204, 205, 206, which in turn communicate with the UEs. An RNC controlling several base stations is called Controlling RNC (C-RNC) for these base stations. A set of controlled base stations accompanied by their C-RNC is referred to as Radio Network Subsystem (RNS) 207, 208. For each connection between User Equipment and the UTRAN, one RNS is the Serving RNS (S-RNS). It maintains the so-called Iu connection with the Core Network (CN) 101. When required, the Drift RNS 302 (D-RNS) 302 supports the Serving RNS (S-RNS) 301 by providing radio resources as shown in FIG. 3. Respective RNCs are called Serving RNC (S-RNC) and Drift RNC (D-RNC). It is also possible and often the case that C-RNC and D-RNC are identical and therefore abbreviations S-RNC or RNC are used.

Evolved Utran Architecture

Currently, the feasibility study for UTRAN Architecture Evolution from the current R99/4/5 UMTS architecture is ongoing (see 3GPP TSG RAN WG3: "Feasibility Study on the Evolution of the UTRAN Architecture", available at http://www.3gpp.org). Two general proposals for the evolved architecture (see 3GPP TSG RAN WG3, meeting #36, "Proposed Architecture on UTRAN Evolution", Tdoc R3-030678 and "Further Clarifications on the Presented Evolved Architecture", Tdoc R3-030688, available at http://www.3gpp.org) have emerged. The proposal entitled "Further Clarifications on the Presented Evolved Architecture" will be discussed in the following in reference to FIG. 4.

The RNG (Radio Network Gateway) 401 is used for interworking with the conventional RAN, and to act as a mobility anchor point meaning that once an RNG 401 has been selected for the connection, it is retained for the duration of the call. This includes functions both in control plane and user plane.

On the control plane the RNG 401 acts as a signaling gateway between the evolved RAN and the CN, and the evolved RAN and R99/4/5 UTRAN. It has the following main functions:

Iu signaling gateway, i.e. anchor point for the RANAP (Radio Access Network Application Part) connection, RANAP connection termination, including:
Setup and release of the signaling connections
Discrimination of connectionless messages
Processing of RANAP connectionless messages,
Relay of idle and connected mode paging message to the relevant NodeB+(s),
The RNG takes the CN role in inter NodeB+relocations,
User plane control and
Iur signaling gateway between NodeB+402-405 and R99/4/5 RNC.

Further, the RNG is the user plane access point from the CN or conventional RAN to the evolved RAN. It has the following user plane functions:
User plane traffic switching during relocation,
Relaying GTP (GPRS tunneling protocol on the Iu interface) packets between NodeB+and SGSN (Serving GPRS Support Node, an element of the CN) and
Iur interworking for user plane.

The NodeB+402-405 element terminates all the RAN radio protocols (Layer 1—Physical Layer, Layer 2—Medium Access Control and Radio Link Control sub-layers, and Layer 3—Radio Resource Control). NodeB+402-405 control plane functions include all the functions related to the control of the connected mode terminals within the evolved RAN. Main functions are:

Control of the UE,
RANAP connection termination,
Processing of RANAP connection oriented protocol messages
Control/termination of the RRC (Radio Resource Control) connection and
Control of the initialization of the relevant user plane connections.

The UE context is removed from the (serving) NodeB+ when the RRC connection is terminated, or when the functionality is relocated to another NodeB+(serving NodeB+ relocation). Control plane functions include also all the functions for the control and configuration of the resources of the cells of the NodeB+402-405, and the allocation of the dedicated resources upon request from the control plane part of the serving NodeB+. The "+" in the term "NodeB+" expresses the enhanced functionality of the base station in comparison to the R99/4/5 specifications.

User plane functions of the NodeB+402-405 include the protocol functions of PDCP (Packet Data Convergence Protocol), RLC (Radio Link Control) and MAC (Media Access Control) and Macro Diversity Combining.

Enhanced Uplink Dedicated Channel (E-DCH)

Uplink enhancements for Dedicated Transport Channels (DTCH) are currently studied by the 3GPP Technical Specification Group RAN (see 3GPP TR 25.896: "Feasibility Study for Enhanced Uplink for UTRA FDD (Release 6)", available at http://www.3gpp.org). Since the use of IP-based services become more important, there is an increasing demand to improve the coverage and throughput of the RAN as well as to reduce the delay of the uplink dedicated transport channels. Streaming, interactive and background services could benefit from this enhanced uplink.

One enhancement is the usage of adaptive modulation and coding schemes (AMC) in connection with Node B controlled scheduling, thus an enhancement of the Uu interface. As mentioned in the previous section, in the existing R99/R4/R5 system the uplink maximum data rate control resides in the RNC. By relocating the scheduler in the Node B the latency introduced due to signaling on the interface between RNC and Node B can be reduced and thus the scheduler is able to respond faster to temporal changes in the uplink load. This will reduce the overall latency in communications of the UE with the RAN. Therefore Node B controlled scheduling is capable of better controlling the uplink interference and smoothing the noise rise variance by allocating higher data rates quickly when the uplink load decreases and respectively by restricting the uplink data rates when the uplink load increases. The coverage and cell throughput may be improved by a better control of the uplink interference.

Another technique, which may be considered to reduce the delay on the uplink, is introducing a shorter TTI (Transmission Time Interval) length for the E-DCH compared to other transport channels. A TTI length of 2 ms is currently investigated for use on the E-DCH, while a TTI of 5 ms is commonly used on the other channels. Hybrid ARQ, which was one of the key technologies in HSDPA, is also considered for the enhanced uplink dedicated channel. The hybrid ARQ protocol between Node B and UE allows for rapid retransmissions of erroneously received data units, thus reducing the number of RLC (Radio Link Control) retransmissions and the associated delays. This can improve the quality of service experienced by the end user.

To support enhancements described above, a new MAC sub-layer is introduced which will be called MAC-eu in the following. The entities of this new sub-layer, which will be described in more detail in the following sections, may be located in UE and Node B. On UE side, the MAC-eu performs the new task of multiplexing upper layer data (e.g. MAC-d) data into the new enhanced transport channels and operating HARQ protocol transmitting entities.

E-DCH MAC Architecture at the UE

FIG. 5 shows the exemplary overall E-DCH MAC architecture on UE side. A new MAC functional entity, the MAC-eu 503, is added to the MAC architecture of Rel/99/4/5. The MAC-eu 503 entity is depicted in more detail in FIG. 6 (see 3GPP TSG RAN WG 1, meeting #31: "HARQ Structure", Tdoc R1-030247, available of http://www.3gpp.org).

There are M different data flows (MAC-d) carrying data packets to be transmitted from UE to Node B. These data flows can have different QoS (Quality of Service), e.g. delay and error requirements, and may require different configuration of HARQ instances. Therefore the data packets can be stored in different Priority Queues. The set of HARQ transmitting and receiving entities, located in UE and Node B respectively will be referred to as HARQ process. The scheduler will consider QoS parameters in allocating HARQ processes to different priority queues. MAC-eu entity receives scheduling information from Node B (network side) via Layer 1 signaling.

E-DCH MAC Architecture at the UTRAN

In soft handover operation the MAC-eu entities in the E-DCH MAC Architecture at the UTRAN side may be distributed across Node B (MAC-eub) and S-RNC (MAC-eur). The scheduler in Node B chooses the active users and performs rate control by determining and signaling a commanded rate, suggested rate or TFC (Transport Format Combination) threshold that limits the active user (UE) to a subset of the TCFS (Transport Format Combination Set) allowed for transmission.

Every MAC-eu entity corresponds to a user (UE). In FIG. 7 the Node B MAC-eu architecture is depicted in more detail. It can be noted that each HARQ Receiver entity is assigned certain amount or area of the soft buffer memory for combining the bits of the packets from outstanding retransmissions. Once a packet is received successfully, it is forwarded to the reordering buffer providing the in-sequence delivery to upper layer. According to the depicted implementation, the reordering buffer resides in S-RNC during soft handover. FIG. 8 the S-RNC MAC-eu architecture which comprises the reordering buffer of the corresponding user (UE) is shown. The number of reordering buffers is equal to the number of data flows in the corresponding MAC-eu entity on UE side. Data and control information is sent from all Node Bs within Active Set to S-RNC during soft handover.

It should be noted that the required soft buffer size depends on the used HARQ scheme, e.g. an HARQ scheme using incremental redundancy (IR) requires more soft buffer than one with chase combining (CC).

E-DCH Signaling

E-DCH associated control signaling required for the operation of a particular scheme consists of uplink and downlink signaling. The signaling depends on uplink enhancements being considered.

In order to enable Node B controlled scheduling (e.g. Node B controlled time and rate scheduling), UE has to send some request message on the uplink for transmitting data to the Node B. The request message may contain status information of a UE e.g. buffer status, power status, channel quality estimate. Based on this information Node B can estimate the noise rise and schedule the UE. With a grant message sent in the downlink from Node B to the UE, Node B assigns the UE the TFCS with maximum data rate and the time intervals, the UE is allowed to send.

In the uplink UE has to signal Node B with a rate indicator message information that is necessary to decode the transmitted packets correctly, e.g. transport block size (TBS), modulation and coding scheme (MCS) level, etc. Furthermore, in case HARQ is used, the UE has to signal HARQ related control information (e.g. Hybrid ARQ process number, HARQ sequence number referred to as New Data Indicator (NDI) for UMTS Rel.5, Redundancy version (RV), Rate matching parameters etc.)

After reception and decoding of transmitted packets on enhanced uplink dedicated channel (E-DCH) the Node B has to inform the UE if transmission was successful by respectively sending ACK/NACK in the downlink.

Mobility Management within R99/4/5 UTRAN

In this section some frequently used terms will be briefly defined and some procedures connected to mobility management will be outlined (see 3GPP TR 21.905: "Vocabulary for 3GPP Specifications" available at http://www.3gpp.org).

A radio link may be a logical association between single UE and a single UTRAN access point. Its physical realization comprises radio bearer transmissions.

A handover may be defined as transfer a users connection from one radio bearer to another. In a "hard handover" of a new radio link is established. In contrast, during "soft handover" (SHO) radio links are established and abandoned such that the UE always keeps at least one radio link to the UTRAN. Soft handover is specific for networks employing Code Division Multiple Access (CDMA) technology. Handover execution is commonly controlled by S-RNC in mobile radio network.

The "active set" comprises a set of radio links simultaneously involved in a specific communication service between UE and radio network, e.g. during soft handover, the UE's active set comprises all radio links to the RAN's Node Bs serving the UE.

Active set update procedures may be used to modify the active set of the communication between UE and UTRAN. The procedure may comprise three functions: radio link addition, radio link removal and combined radio link addition and removal. The maximum number of simultaneous radio links is commonly set to four. New radio links may be added to the active set once the pilot signal strengths of respective base stations exceed certain threshold relative to the pilot signal of the strongest member within active set. A radio link may be removed from the active set once the pilot signal strength of the respective base station exceeds certain threshold relative to the strongest member of the active set.

The threshold for radio link addition may be typically chosen to be higher than that for the radio link deletion. Hence, addition and removal events form a hysteresis with respect to pilot signal strengths.

Pilot signal measurements are reported to the network (S-RNC) from UE by means of RRC signaling. Before sending measurement results, some filtering is usually performed to average out the fast fading. Typical filtering duration is about 200 ms and it contributes to handover delay (see 3GPP TS 25.133: "Requirements for Support of Radio Resource Management (FDD)", available at http://www.3gpp.org). Based on measurement results, S-RNC may decide to trigger the execution of one of the functions of active set update procedure (addition/removal of a Node B to/from current Active Set).

E-DCH—Operation During Soft Handover

Supporting soft handover is desirable to obtain the macro diversity gain. In HSDPA for example no soft handover is supported for the HS-DSCH (High Speed Downlink Shared Channel) transport channel. Applying soft handover causes the problem of distributing scheduling responsibilities across all Node Bs of the active set and would require extremely tight timing to provide the scheduling decision to all members of the active set even if distribution of scheduling function were resolved. Only one Node B is transmitting on HS-DSCH to a UE and thus no macro diversity gain is exploited. When UE enters soft handover region for dedicated channels, the Node B, which is allowed to transmit on HS-DSCH, has to be determined. The selection of serving Node B may be done from either the UE side or from network side (by RNC).

In the Fast Cell Selection (FCS) method for HS-DSCH, the UE selects the cell that is the most suitable for transmitting data. UE periodically monitors the channel conditions in the cells within the active set to check whether there is a cell with better channel conditions than the current serving cell.

In case soft handover is not supported for the uplink, a serving Node B has to be selected. One problem, which might occur, is inaccurate selection of the serving Node B. Thus there may be a cell within active set more suitable for uplink transmission than the chosen uplink serving Node B. Therefore, data transmission to a cell controlled by current serving Node B could fail, whereas the transmission to the cells controlled by other Node Bs would have been successful. The accuracy of the selection depends on several factors like signaling delay, filtering of measurement results etc.

To conclude, supporting SHO operation for E-DCH is useful because of macro diversity gain and because possible transmission failures due to an inaccurate selection of the best uplink serving Node B can be eliminated.

Soft Handover Operation without Soft Buffer Synchronization

A flow chart for Node B soft handover operation without soft buffer synchronization assuming R99/R4/R5 architecture is given in FIG. 9. The figure depicts the operation of an arbitrary Node B from the Active Set.

Each Node B within active set monitors the enhanced dedicated physical data channel (E-DPDCH) in step 901 for the reception of uplink traffic. In case a packet is received in step 903 within a transmission time interval (TTI) (see step 902), Node B has to decide if the packet was the initial transmission or a retransmission of a previously sent data packet. The decision is based on associated uplink control signaling, e.g. the New Data Indicator (NDI). In case the received packet was a retransmission then Node B has to combine the received data packet with the previous transmissions stored in the soft buffer before decoding in step 905. For an initial transmission Node B stores (see step 906) the received packet in the corresponding soft buffer (possible previous transmissions stored in the that soft buffer are overwritten) and can immediately try to decode the packet upon reception.

The testing whether decoding was successful or not (see step 907) is done by evaluating the CRC checksum. If the packet is correctly decoded, Node B passes it to higher layer and sends it to S-RNC via Iub/Iur interface in step 908. In case decoding was not successful the soft information is stored in the soft buffer in step 909.

As outlined above, soft handover operation provides an additional macro diversity gain but also complicates system design to a certain extent. Taking the E-DCH as an example, there is a single transmitting protocol entity and multiple receiving protocol entities for soft handover operation, while for non-soft handover operation there are only a single transmitting and a single receiving protocol entity.

Radio Bearer Establishment

Before starting of any transmission the radio bearer may be established and all layer should be configured accordingly (see 3GPP TS25.331 Radio Resource Control (RRC) protocol specification", available at http//www.3gpp.org). The procedures for establishing radio bearers may vary according to the relation between the radio bearer and a dedicated transport channel. Depending on the QoS (Quality of Service) parameters, there may or may not be a permanently allocated dedicated channel associated with the RB.

Radio Bearer Establishment with Dedicated Physical Channel Activation

In UMTS the procedure in FIG. 10 may be used when a new physical channel needs to be created for the radio bearer. A Radio Bearer Establishment may be initiated when an RB Establish Request primitive is received from the higher layer Service Access Point on the network side of the RRC layer. This primitive may comprise a bearer reference and QoS parameters. Based on these QoS parameters, Layer 1 and Layer 2 parameters may be chosen by the RRC entity on the network side.

The physical layer processing on the network side my be started with the CPHY-RL-Setup request primitive issued to all applicable Node Bs. If any of the intended recipients is/are unable to provide the service, it may be indicated in the confirmation primitive(s). After setting up Layer 1 including the start of transmission/reception in Node B, the NW-RRC may send a RADIO BEARER SETUP message to its peer entity (acknowledged or unacknowledged transmission optional for the NW). This message may comprise Layer 1, MAC and RLC parameters. After receiving the message, the UE-RRC configures Layer 1 and MAC.

When Layer 1 synchronization is indicated, the UE may send a RADIO BEARER SETUP COMPLETE message in acknowledged-mode back to the network. The NW-RRC may configure MAC and RLC on the network side.

After receiving the confirmation for the RADIO BEARER SETUP COMPLETE, the UE-RRC may create a new RLC entity associated with the new radio bearer. The applicable method of RLC establishment may depend on RLC transfer mode. The RLC connection can be either implicitly established, or explicit signaling can be applied. Finally, an RB Establish Indication primitive may be sent by UE-RRC and an RB Establish Confirmation primitive may be issued by the RNC-RRC.

A simple HARQ operation is currently only possible for a communication between a single transmitter and a single receiver in case of ensuring reliable feedback transmission. The feedback transmission ensures that sender and receiver are synchronized. By increasing the sequence number value of a window based HARQ process or toggling the New Data Indicator (NDI) of a stop-and-wait (SAW) HARQ process in the associated HARQ control information the receiver knows if a new packet is being received and if it can flush the soft buffer accordingly.

This ensures that a new packet will not be combined with a previously stored packet in the receiver. A wrong combining of packets before decoding may be a rare case, but cannot be completely excluded if feedback signaling is not entirely reliable. A correct decoding will not be possible in that case.

Hence the receiver may request for a retransmission of that packet by signaling a NAK. Retransmission of this packet may go on until the maximum number of retransmissions is reached. If there are many retransmissions of a 'new' packet which was combined with previous soft buffer values of an 'old' packet the influence of the soft values of the 'old' packet may be reduced due to successive combining with the new packet allowing a successful decoding of the new packet. How strong the throughput is affected by packet retransmissions may depend on the likelihood of an erroneous operation of the packet retransmission procedure. There may be a trade-off between the overhead spent for reliable signaling and likelihood for erroneous protocol operation. In the same way there may be a procedure to inform the receiver whether a packet has been aborted by the transmitter. This could for instance be caused by reaching the maximum number of retransmissions or in case the assigned delay attribute (or Ume to live value) could not be met.

Some communication systems as Wideband Code Division Multiple Access (W-CDMA) rely on soft handover operation. In addition to the problem that now multiple feedbacks of each receiver need to be received correctly there is also the problem to synchronize the HARQ soft buffer between the transmitter and a multiplicity of receivers. Not all Node Bs may be able to receive the associated control signaling from the UE, which is needed for a correct processing of the received packet. Assuming that the control information has been received Node B can try to decode the packet and buffer the soft values in case a successful decoding is not possible. It is likely that there is one Node B (e.g. the best link) that is able to decode the packet whereas others do not receive anything.

Transmission of new packets will continue to the best Node B while there are still old packets buffered at other receivers.

In WO 92/37872 a method is introduced that unveils the HARQ operation during soft handover from one transmitter to multiple receivers in the uplink. Reception cannot be guaranteed since power control and thus transmit power is usually adapted to the best link within Active Set. That means as well that reliable feedback from all the receivers is difficult to achieve The transmit power in the uplink needs to be increased for the "bad" links to ensure a well synchronized operation which will increase the uplink interference significantly. WO 92/37872 proposes to increase the HARQ protocol reliability by adding a flush bit to the associated HARQ uplink control information.

A set flush bit informs the receiver not to combine the packet with previous transmissions, but to flush the HARQ soft buffer of that HARQ process. This works in principle, but has two drawbacks. Firstly it assumes that the transmitter knows the state of the receiver, because it has to inform it when to flush the buffer. If the transmitter is not sure about the receiver state due to unreliable or missing feedback the buffer should be flushed. This will lead to loss of information in case the packet had already been received and stored in the soft buffer. Secondly it needs to transmit that flush bit with high reliability along the HARQ control information. This will increase the over the air signaling overhead in the uplink.

The problems of non-synchronized buffers during a soft handover operation with multiple base stations operating as receivers has been described in detail. Existing solutions rely, besides on regular HARQ control information such as HARQ process and HARQ sequence number or NDI, on additional signaling to flush the soft buffer and avoid erroneous combining.

SUMMARY OF THE INVENTION

The object of the present invention is to prevent erroneous combining of data packets in a packet retransmission scheme at the receiver. The erroneous combining may be caused by non-synchronized soft buffers of multiple receivers.

The object of the present invention is solved by the subject matter of the independent claims. Preferred embodiments of the present invention are defined in the dependent claims.

Taking a window based HARQ protocol as an example for a data packet retransmission scheme, it should not happen that a packet is received with same sequence number as an old packet in the soft buffer. This phenomenon is called wrap around problem. The HARQ window is advanced while the soft buffer of that sequence number is not flushed. For N-channel Stop-and-Wait protocol the issue is the similar. The same HARQ process should not be scheduled again with a new packet unless this is indicated and the soft buffer is flushed.

The present invention may ensure a correct protocol operation with multiple base stations as data receivers while avoiding additional signaling over the air interface or within the network. In a first step each buffer may be flushed after each successful decoding of a received data packet or a combination of an erroneous data packet and retransmissions relating thereto. In addition or alternatively to the immediate buffer flush upon correct reception of a data packet, the time elapsed since the last storing in a particular buffer region may be monitored in each base station, e.g. by means of a timer or counter. The monitoring may ensures that old packets in the soft buffer are flushed before a new packet is received.

A threshold time period, i.e. the maximum allowable time period after which no retransmission of a data packet may arrive at a base station may be predetermined or configured. After the expiry of this time period, an associated buffer region in the base station is flushed and new data packet may be received. Configuration of the threshold time period may be done by higher layer signaling between a communication terminal, such as an UE, and a receiver, such as a base station. The starting value of the timer may correspond to the threshold time period.

Hence, the communication terminal may "know" about the time when a buffer region for a particular data packet and its related retransmissions, will be flushed at a base station it communicates with. Therefore, it may know until what point in time a retransmission of a specific data packet or retransmission data packet has to be received at the base station to gain from soft combining. If the buffer has been flushed in the receiver the communication terminal may use that knowledge in selecting the correct transmission parameter for a new transmission of the aborted data packet.

The present invention provides a method for use in a packet retransmission scheme in a mobile communication system comprising a communication terminal and a plurality of base stations, wherein the communication terminal is in communication with the plurality of base stations during a soft handover. The method may comprise the steps of receiving a data packet from the communication terminal at the plurality of base stations and checking data integrity of the received data packet at each of the base stations. If data integrity of the received data packet was not confirmed by a base station, the received data packet may be stored in a region of a buffer of the respective base station, wherein the buffer region is associated with said received data packet. The time elapsed since the storing of the data packet in the associated buffer region may be monitored. It should be noted that the plurality of base stations may not refer to all base stations that are controlled by a control unit or a plurality of control units in the mobile communication network, but rather to the base stations communicating with the communication terminal during soft handover. In UMTS this plurality of base stations may be referred to as the active set of the communication terminal. Hence, the plurality of base stations may be a subset of the base stations available for communication in the mobile communication network.

If data integrity of said received data packet was confirmed, the associated buffer region my be flushed in respective base station.

As an alternative solution of the object as stated above, the present invention further provides a method for updating the soft buffer of a base station in a mobile communication system comprising a communication terminal and a plurality of base stations. According to this embodiment, the communication terminal is in communication with the plurality of base stations during a soft handover. According to the method, a data packet from the communication terminal may be received at the plurality of base stations.

Further, data integrity of said received data packet may be checked at each of the base stations, and if data integrity of said received data packet was confirmed, a buffer region associated with said received data packet may be flushed.

In another embodiment of the present invention, if data integrity of said received data packet was not confirmed by a base station, the received data packet may be stored in an associated region of a buffer of the respective base station, and the time elapsed since the storing of said data packet in said associated buffer region ma be monitored.

If the respective monitored time period is equal to or larger than a threshold time period after which a retransmission data packet can no longer be expected in the respective base station the buffer region may be flushed. The data packet may for example be received via a dedicated channel.

In case the data integrity of an initial transmission of a data packet or the integrity of a retransmission data packet was not confirmed by a base station a retransmission data packet may be requested in accordance with a packet retransmission scheme. Hence, in a further embodiment, a retransmission data packet may be received from the communication terminal at the plurality of base station. Upon reception, a base station may perform a data integrity check of the received retransmission data packet at each of the base stations, and if data integrity was not confirmed by the base station, the retransmission data packet may be stored in the buffer region associated with a previous data packet relating to the retransmission data packet, and the monitoring of the time elapsed since the storing of the retransmission data packet in the associated buffer region may be restarted.

The data integrity check performed on the retransmission data packet may comprise combining the retransmission data packet with the related data packet to obtain a combined data packet, decoding the combined data packet to obtain decoded data, and checking the integrity of the decoded data. In more general terms, checking the data integrity may be done by verifying the incorruption of the received data corresponding to a (re)transmission process of a specific data packet, e.g. by means of a cyclic redundancy check (CRC).

If data integrity of a received data packet was confirmed, the associated buffer region may be flushed.

Upon receiving a retransmission data packet from the communication terminal at the plurality of base stations, a data integrity check of the received retransmission data packet at each of the base stations may be performed, and if data integrity of was confirmed by a base station, the monitoring of the time elapsed since the storing of the transmission data packet in the associated buffer region may be stopped. It is further, noted, that in the case above the retransmission data packet may be stored in the buffer region. The term data packet may be understood as a generic expression referring to a retransmission packet or an initial transmission.

If the respective monitored time period is equal to or larger than a threshold time period, the monitoring of the respective data packet may be also stopped, as it is not very likely to receive a retransmission data packet for the data packet associated to the buffer region. By flushing the buffer region it may be ensured that when reusing the buffer region a new data packet is not combined with the "old" content—i.e. a data packet and its related retransmissions received previously—of this buffer region.

As outlined above it is desirable that the threshold time period is of configurable duration.

Signaling the duration of the threshold time period to at least one of the plurality of base stations may be accomplished by using radio network control signaling from a control unit in the mobile communication network. For example, when employing a RAN according to the UMTS specifications, the duration of the threshold time period may be signaled to the at least one base station in an information element of a NBAP (Node B Application Part) message.

Further, the signaling of the duration of the threshold time period to the communication terminal may be accomplished by radio resource control signaling from a control unit in the mobile communication network. Again, when employing a RAN according to the UMTS specifications, the duration of the threshold time period may signaled to the communication terminal in an IE (information element) of at least one of a radio bearer setup message, radio bearer reconfiguration message, radio resource control connection setup message, transport channel reconfiguration message, cell update message, and a handover command message.

In accordance with a packet retransmission scheme, e.g. HARQ, the reception status of a data packet may be indicated to the communication terminal. Therefore, a message from at least one of the plurality of base stations may be transmitted to the communication terminal indicating whether at least one of the plurality of base stations confirmed data integrity of the received data packet.

A successfully received and decoded data packet may be forwarded to a higher layer for further processing. Hence, according to an embodiment of the present invention the received data packet is transmitted to a control unit of the mobile communication system by at least one of the base stations that did confirm data integrity of the received data packet.

As the communication terminal may not have sufficient capacity assigned for retransmitting a corrupted data packet before a buffer region flush at a base station, it may signal to the base station to increase its assigned capacity for the retransmission data packet. A base station therefore receives a capacity request message from the communication terminal requesting additional transmission capacity for a retransmission of a data packet.

Advantageously, the capacity request message comprises at least one of a transmission priority of a data packet to be transmitted by the communication terminal, the size of data in a transmission buffer of the communication terminal and the duration of the monitored time period. These parameters may advantageously be used by the base station to decide whether to increase the assigned channel capacity for the requesting communication terminal or not. Alternatively, according to a further embodiment of the present invention, the capacity request of the communication terminal may include HARQ side information, e.g. sequence number, HARQ process or New Data Indicator to identify the packet for which capacity is requested. For the packet indication the base station may know some of the corresponding parameter of that packet such as for example the threshold time period and the priority of the data packet. Similarly the communication terminal may identify the physical channel, the transport channel and/or the logical channel for which it is requesting capacity.

In response to the capacity request message or in case the base station is able to increase the capacity assigned to the communication terminal, a capacity grant message is transmitted to the communication terminal, wherein the capacity grant message indicates a transmission capacity assigned to the communication terminal for data transmission.

Another possibility to prevent the flushing of a buffer region associated to a specific data packet and its related retransmission data packets, may be to transmit a restart request message to a base station, wherein the restart request message indicates a data packet for which monitoring of the time elapsed since the storing of the data packet (or a related retransmission data packet) in the associated buffer region has to be restarted. A base station may receive this restart request message and restart the monitoring. The restart request message may comprise control information and no or dummy payload data.

In another alternative embodiment of the present invention, upon expiry of the threshold time period, a base station may mark an associated buffer region of the packets as a buffer region to be flushed. If a new packet associated to that buffer region (e.g. identified by the sequence number) is received it may finally flush the soft buffer unless it received some additional control information. Such control information may be a combine indicator. A combine indicator may be realized as flag which may be sent if the transmitted data packet should be combined. In the latter case the marked buffer region may not be flushed and a combining will still take place although the timer already expired. This may allow for a soft combing even if a retransmission of a data packet is delayed.

When using a window based packet retransmission scheme, the method may further comprise the step of calculating the threshold time period based on the time required for the transmission of all data packets within a window of the packet retransmission scheme.

Independent of the retransmission scheme used, the threshold time period may also be calculated based on the time interval between the reception of an initial data packet and the reception of a retransmission data packet.

According to another embodiment, the calculation of the duration of the threshold time period may be based on at least one of the following parameters: size of the buffer, the maximum number of packet retransmissions in a data packet retransmission scheme, the communication terminal's processing time for a feedback message, the respective base station's processing time for a received data packet and a transmission time interval.

The present invention further provides a base station in a mobile communication system comprising a communication terminal and a plurality of base stations, wherein the communication terminal is in communication with the plurality of base stations during a soft handover, and wherein the base station comprises means for implementing the method described above.

In another embodiment, the present invention provides to a method for scheduling data retransmissions in a communication terminal being part of a mobile communication system comprising the communication terminal and a plurality of base stations, wherein the communication terminal is in communication with the plurality of base stations during a soft handover. The method may comprise the steps of transmitting a data packet to the plurality of base stations, receiving at least one feedback message from at least one of the base stations, evaluating the at least one feedback message to determine whether data integrity of the transmitted data packet was confirmed by at least one of the plurality of base stations, and if data integrity of the transmitted data packet was not confirmed by a base station, monitoring the time period elapsed since the transmission of the data packet or the reception of the respective feedback message, to schedule a retransmission relating to the data packet to occur not after expiry of a threshold time period after which a reception of a retransmission data packet can no longer be expected in the respective base station.

If data integrity of the transmitted data packet was not confirmed and at a point in time where the monitored time period is smaller than the threshold time period, a capacity request message may be transmitted to the plurality of base stations requesting further transmission capacity for a retransmission of a data packet as already outlined above.

If a capacity grant message indicating a transmission capacity assigned to the communication terminal for data transmissions was not received from a base station of the plurality of base stations or no additional capacity was assigned to the UE in response to a capacity request message, a restart request message may be transmitted from the communication terminal to a base stations, wherein said restart request message indicates a data packet for which monitoring at the respective base station has to be restarted.

The usage of a restart request message is not bound to the results of a request for additional transmission capacity. According to another embodiment of the present invention, if data integrity of the transmitted data packet was not confirmed and at a point in time where the monitored time period is smaller than the threshold time period, a restart request message may be transmitted to a base stations, wherein the restart request message indicates a data packet for which monitoring at the respective base station has to be restarted.

As will be explained further down below in more detail, in case a retransmission data packet may not be transmitted from the communication terminal before the associated buffer region at the base station will be flushed, e.g. due to insufficient capacity assigned, the communication terminal may await the flushing of the buffer region to transmit a new initial data packet. Therefore, the method may comprise the step of stalling the retransmissions a data packet until the respective monitored time period is larger than the threshold time interval, if data integrity of the transmitted data packet was not confirmed and at a point in time where the monitored time period is smaller than the threshold time period.

In order to initiate the transmission of a retransmission data packet if data integrity of the transmitted data packet was not confirmed, a scheduler in the communication terminal is informed and may reschedule the transmitted data packet for retransmission. In analogy, if data integrity for the transmitted data packet was confirmed, the scheduler may be informed by the communication terminal in order to remove the transmitted data packet from a transmission buffer of the communication terminal.

When a retransmission relating to the initial data packet becomes necessary, the communication terminal may transmit the retransmission data packet to the plurality of base stations, and in turn receives at least one feedback message from at least one of the base stations. Next, the at least one feedback message may be evaluated to determine whether data integrity of the transmitted retransmission data packet was confirmed by at least one of the plurality of base stations, and if data integrity was confirmed, the monitoring of the time elapsed since the transmission of the a data packet or the reception of a respective feedback message may be restarted. E.g. when using a timer for monitoring the timer is reset to its initial threshold value and is started again.

Further the present invention provides a communication terminal in a mobile communication system comprising a communication terminal and a plurality of base stations, wherein the communication terminal is in communication with the plurality of base stations during a soft handover, and wherein the communication terminal comprises means for implementing the method steps as outlined before.

According to another embodiment of the present invention, the communication terminal and the base station as described above may be advantageously be combined in a mobile communication system.

BRIEF DESCRIPTION OF THE FIGURES

In the following the present invention is described in more detail in reference to the attached figures and drawings. Similar or corresponding details in the figures are marked with the same reference numerals.

DETAILED DESCRIPTION OF THE INVENTION

It is noted that the different embodiments in the following will be described mainly in relation to the HARQ packet retransmission scheme and UMTS. Nevertheless, the principles underlying the present invention are also applicable to other data packet retransmission schemes and to other mobile communication systems than UMTS that provide soft handover of communication terminals and packet retransmission mechanisms.

Figure 11:
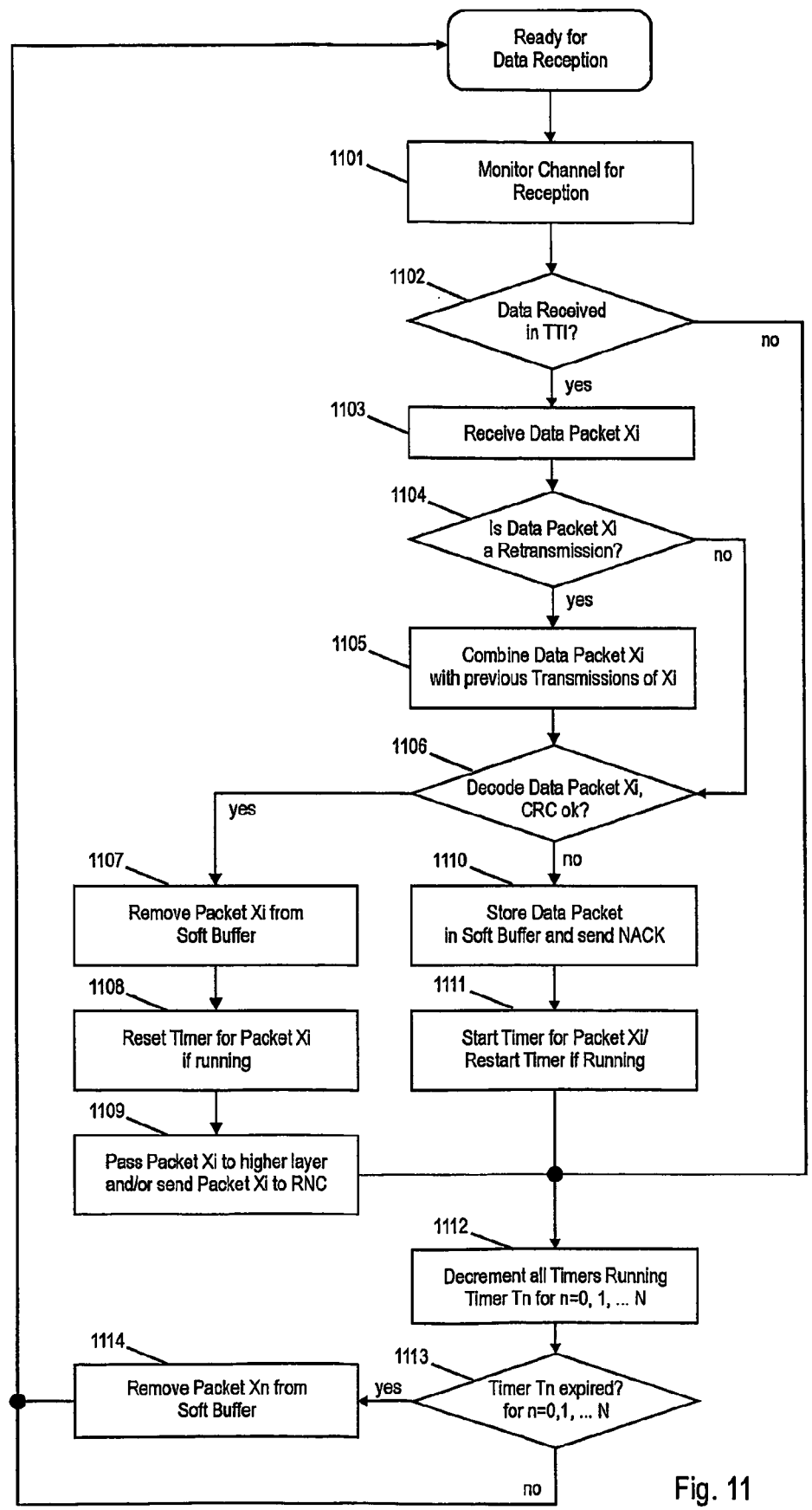
FIG. 11 shows a flow chart of the operation of a base station according to an embodiment of the present invention.

In FIG. 11 shows an illustrative flow chart of the operation of a base station within the active set of a UE during soft handover. The base station may monitor the physical channels in step 1101 and may regularly check whether one or more data packets are received within a transmission time interval (TTI) in step 1102. If a data packet is sent to the base station, it is received in step 1103 and upon reception the base station decides, whether the received data packet is an initial data packet or a retransmission relating to an initial data packet in step 1104. Further, in case the received data packet is a retransmission data packet the base station will combine the retransmitted data with related soft values stored in an associated soft buffer region of the base station in step 1105. For example if the initial data packet has not been received correctly, i.e. its data is corrupted and could not be decoded by the base station, the retransmission data relating to this initial data packet is combined with the data from this initial data packet and the combined data packet is decoded in step 1106. In case an initial data packet is received, the packet can be decoded directly without previous combination in step 1106. Step 1106 further checks the data integrity of the decoded data.

Figure 9:
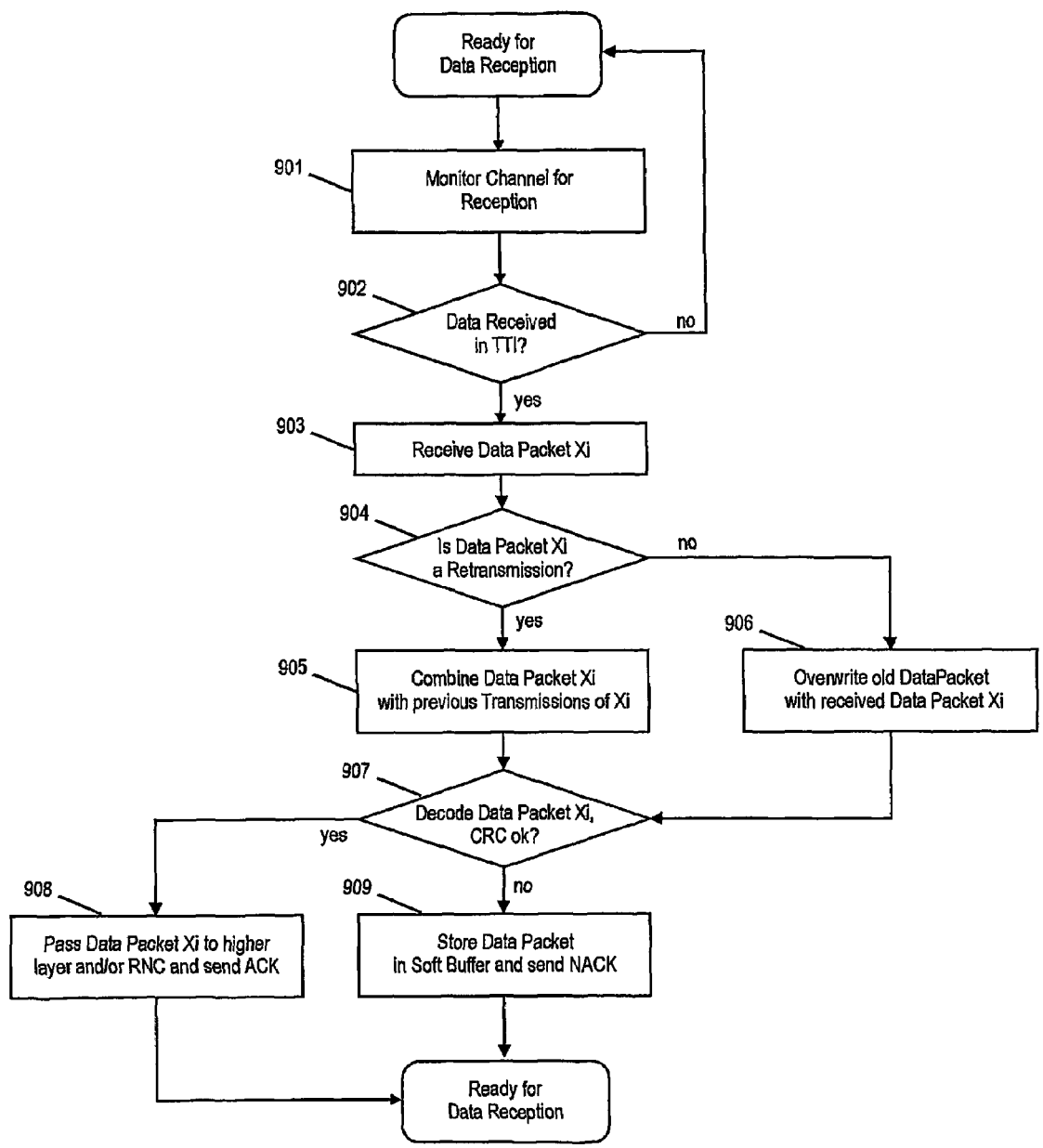
FIG. 9 shows a prior-art flow chart of HARQ receiver operation.

If the data integrity is confirmed, the flow advances to block 1107. As a first improvement compared to the state of the art packet retransmission scheme as illustrated in FIG. 9, a buffer region associated to a data packet and its possible retransmission, e.g. a HARQ soft buffer, will be deleted or flushed immediately after the data packet is received correctly in step 1107 and not only after the a new packet is received as in conventional packet retransmission schemes (confer block 906 in FIG. 9). Hence, the buffer region associated to an initial data packet and its retransmissions is immediately freed upon correctly decoding which ensures that no data from previously received data packets reside in the buffer region upon receiving a new data packet that will be associated with this buffer region.

For data transmissions between a communication terminal and a plurality of base stations the immediate flushing of a soft buffer region can make a difference since some Node B may temporarily not receive control information and the Node B, which is receiving uncorrupted data packets from the UE, may go on with the transmission for some time.

If the buffer region is e.g. flushed immediately after correct decoding of data packet an erroneous combining may be excluded from the beginning. Additionally, a timer that will be started preferably for all new packets (n=0, 1 . . . N) not successfully decoded may used to prevent wrong combining. After or before the soft values of a data packet, i.e. an initial data packet or a retransmission data packet will be stored in the soft buffer, a timer is started to indicate how long the packet has been stored in the buffer or rather how long it can still be kept in the soft buffer before the associated buffer region is flushed. During regular operation with continuous reception a retransmission may be received before the timer expires and the timer for that data packet Xi will be restarted. If a packet is received correctly, besides flushing the associated buffer region 1107, the timer may be stopped for that data packet.

In case a data packet, i.e. the initial data packet alone or a combination of an initial data packet and soft values from one or more retransmission related to this packet, can not be decoded correctly in step 1106, the newly arrived data packet is stored in an associated soft buffer region.

Taking HARQ as an example, in each received data packet, no matter whether an initial data packet or a retransmission data packet, the HARQ process number and the NDI identifies a retransmission of a particular data packet as outlined above. If a data packet of with particular process number is received and can not be decoded correctly, the data packet's soft values may be stored in an associated buffer region together with other data from packets containing the same HARQ process number.

In case a timer for a data packet that may be stored to an associated buffer region is not running, i.e. an initial data packet has been received, the timer associated with the buffer region and the received data packet will be started in step 1111. In case a timer is already running for received data packet's associated buffer region the timer may be restarted (see also step 1111).

Before going to the reception of the next transmission time interval (TTI) all timers may be decremented in step 1112. The timers may be decremented independent of whether a data packet has been received in the elapsed TTI or not.

If it is judged in step 1113 that any of the timers expired, the particular buffer region comprising the initial data packet and, possibly, additional soft values from related retransmission packets received, will be flushed in step 1114, as the respective base station can no longer expect a retransmission data packet relating to the corrupted data packet stored in the soft buffer region. If no timer expired the next data packet is expected for reception.

One criteria for setting the timer value i.e. for setting a threshold time period after which a retransmission data packet is no longer expected in a base station, is to make it small enough to avoid an erroneous combining of different packets. At the same time the timer value should be large enough to avoid a flush of the stored packets for which retransmissions are still pending.

For example in HARQ protocols as used in UMTS Rel. 5, HARQ transmissions may be asynchronous, while ACK/NAK feedback messages may be sent synchronous. This means that it is usually not exactly known to a base station when a retransmission of an initial data packet will be sent by the communication terminal, which makes the setting of the timer rather difficult. In case the UE may transmit data packets autonomously, it may be likely that the retransmission data packet will follow shortly after the transmission of the initial data packet, taking into account the processing time at the base station and the communication terminal. Retransmissions may be sent with higher priority to minimize delay and delay jitter. Furthermore a retransmission should not be pending for too long since the channel conditions may change and thus the transmission format, e.g. packet size, modulation, coding rate, etc. may not be suitable for the channel conditions anymore. Latter case may require an adaptation of the transmission format (TFC—transmission format combination) to the new channel conditions.

The maximum timer value allowable may depend on the detailed packet retransmission protocol design. For example, in a window based HARQ protocol the wrap around problem should be avoided. For reliable ARQ operation the ARQ window may be at least twice the size of the transmitter or receiver window size. As soon as a data packet outside of the window is received the window will be forwarded. Assuming the sequence numbers are used in order to identify a certain position inside the HARQ window, the window is not forwarded in larger steps and all subsequent data packets are received correctly, the timer value may be calculated considering how long it takes to transmit all the packets of the window. In the latter case, the timer would expire before a new transmission of a new data packet with the same sequence number would be initiated.

The larger the window size, or the more HARQ SAW processes or the larger the window per HARQ process, and thus the soft buffer size, the larger the timer value may be. For HARQ the soft buffer size may be one of the main complexity factors since each soft value of a retransmission data packet needs to be buffered in a buffer region. Therefore the window size may not be over dimensioned. This means that the buffer may be dimensioned to store as many packets as being received during the round trip time in continuous transmission. Depending on the receiver implementation the packet may be buffered by means of bit level or symbol level soft values. For higher level modulation (e.g. 16 QAM) buffering in symbol level requires less memory whereas bit level soft values allow for the highest flexibility if for instance certain bits need to be punctured. Another design criteria is the bit granularity i.e. how many bits represent one soft value. Hence, there may be a tradeoff between accuracy and buffer size.

Figure 13:
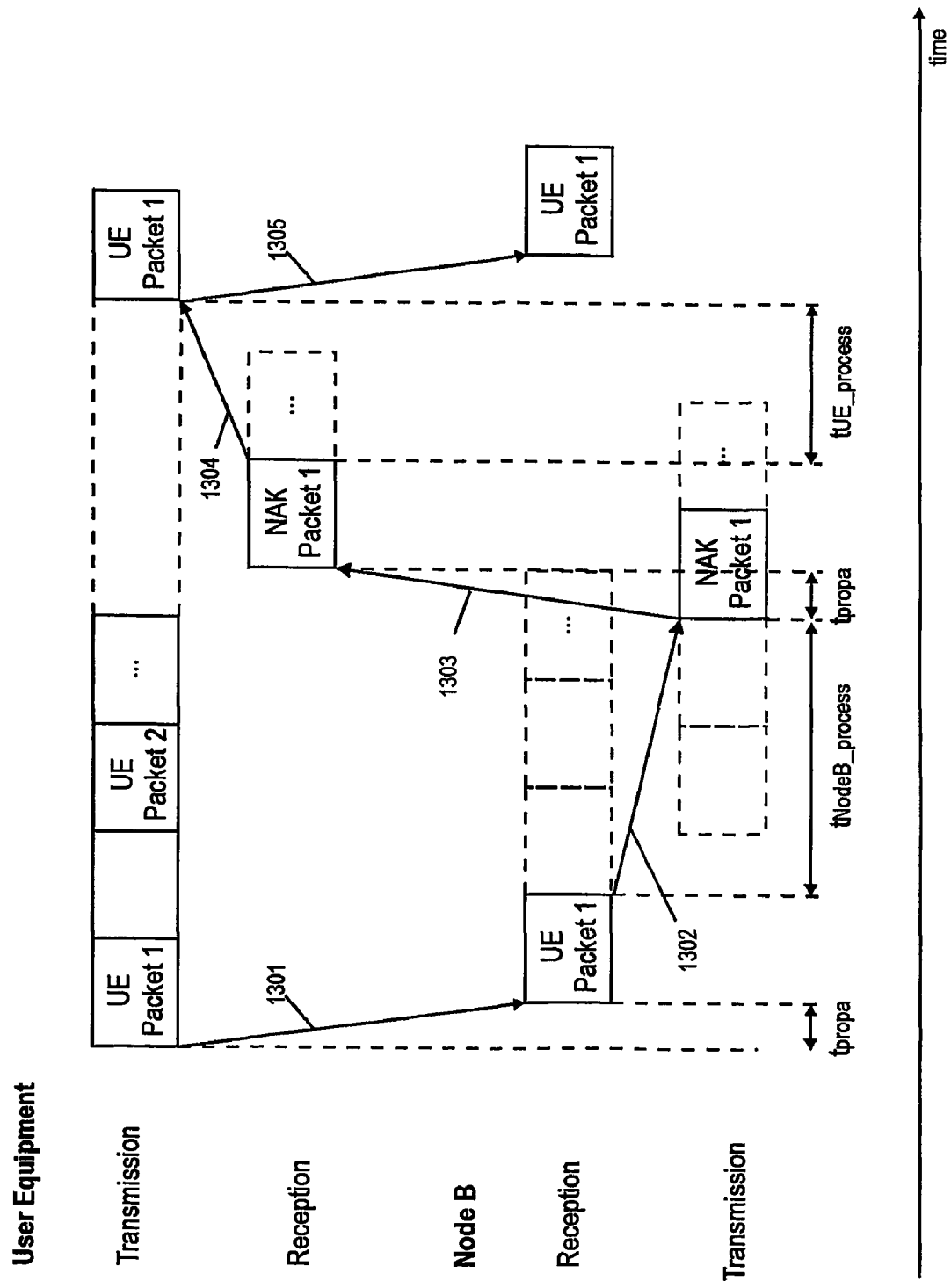
FIG. 13 illustrates the timing of the transmission of data between a communication terminal and a base station according to an embodiment of the present invention.

The round trip time, illustrated in FIG. 13, may be defined as the time from the initial transmission 1301 of a data packet from the UE until a retransmission of the same data packet 1305 upon receiving a negative feedback message. This involves two times the propagation delay $t_{propa}$ plus UE and Node B processing times, $t_{UE\_process}$ and $t_{NodeB\_process}$. Assuming that a retransmission can be sent 6 TTI's after the previous or initial transmission. To realize continuous transmission, this may correspond to a transmitter and receiver window size of at least 6. In a pure window based ARQ system the minimum overall window size may be at least two times the receiver/transmitter window size, i.e in the example equal to 12. This may ensure a unique identification of packets and a correct ARQ operation even if some ACK/NAKs are lost. If there is for instance a NAK to ACK misinterpretation a new packet may not have the same sequence number, but the window would be probably moved indicating to the receiver that this is not the expected retransmission, but a new packet.

The same calculation may be done for N-channel SAW protocols. The previously described ARQ system is equivalent to a 6 channel SAW protocol and a one bit New Data Indicator (equal to a sequence number). In both system the timer may be set to 12 times the TTI to make the protocol work for the worst case scenario. Assuming synchronous transmission as illustrated in the FIG. 13 the maximum timer value for the worst case may be calculated, which will be explained in the following:

The UE may transmits a first data packet with a process number set to 1 and NDI equal to 0 to two Node Bs, whereby Node B1 receives data packet, but can not decode it and thus buffers the soft values in a buffer region of the soft buffer and sends an NAK to the UE to indicate the failed decoding. Node B2 may decode the data packet successfully and sends an ACK. Hence, the UE receives an ACK from Node B2 and the NAK from Node B1.

Further, it is assumed that the UE sends packets 2, 3, . . . , 12 to Node B1 and Node B2, wherein Node B2 receives and successfully decodes all packets. Data packets 1 to 6 may comprise different HARQ process numbers and an NDI set to 0. Packets 7 to 12 are transmitted with the NDI set to 1.

Node B1 may be temporarily out of reception and missed packet 7 with process number 1 and an NDI set to 1. Hence, the Node B1 still has the first data packet with a process number of 1 and an NDI set to 0 stored in the associated soft buffer.

The UE sends new data packet 13 with process number 1 and NDI equal to 0, which is received by Node B1. As the process number and NDI of the new data packet is identical with the process number and NDI of the data packet stored in the buffer, Node B1 combines the two packets as the new data packet is considered to be a retransmission. Hence in a situation as outlined above, Node B1 would erroneously combine data packet 13 with the data of first data packet 1 stored in the soft buffer.

This is a worst case calculation based on very specific assumption which may rarely occur in a real system. First of all the UE may not be scheduled continuously as in the above example. The misinterpretation of the feedback signaling or to completely miss of a packet should also be an exceptional event. Also the ARQ operation may not be synchronous, i.e. retransmission may not be sent after expiry of a fixed time period. There may be retransmissions of some other packets pending which have a higher priority as initial transmission and would supersede new initial transmissions further increasing the time until a wrap around could happen. The limited window size will cause the need of the HARQ buffer to be flushed only after one missed reception.

The packet retransmission scheme or protocol used may be configurable in a flexible way considering for instance Quality of Service (QoS) requirements of specific data flows. This may be for instance a certain bit error rate to be reached or a delay requirement. For example, when using the HARQ protocol configurable parameters may be the size of the HARQ soft buffer, the number of HARQ processes, the time until a packet is aborted, the maximum number of retransmissions, the minimum inter TTI interval or the UE and/or Node B processing time etc. The setting of the timer, when to clear a packet from the soft buffer, may depend on such kind of parameter which should be considered as well.

The problem of non-synchronized Node B buffers may occur during soft handover when two or more Node Bs are receiving and trying to decode the same packet. Therefore RNC may inform the Node B about the soft handover state of each particular UE. A timer may only be started in case the UE is in soft handover.

Further, the Node B may be given a default timer value or the value may be configured by higher layer such as Radio Resource Control. The RNC may signal a message with a new information element e.g. called HARQ_flush_timer. The message may be transmitted to set up or modify a specific physical or transport channel e.g. an Enhanced Dedicated Channel. In UMTS the radio network control protocol is called Node B Application Protocol (NBAP). For enhanced dedicated uplink packet transmission, different scheduling options may be employed. If the Node B controls uplink transmission of the UEs it may prioritize a certain UE that has a timer which is about to expire. This may enable the UE to send the retransmission data packet before timer expiry and a soft buffer flush at the base stations of its active set and to gain from soft combining.

Although retransmissions may have a higher priority the UE scheduling decision may consider other parameters such as channel quality, available transmit power, different priorities of different data flows etc. If the UE can schedule some transmission autonomously or may request additional capacity for transmission, it may prioritize packets of which the timer is about to expire.

Figure 10:
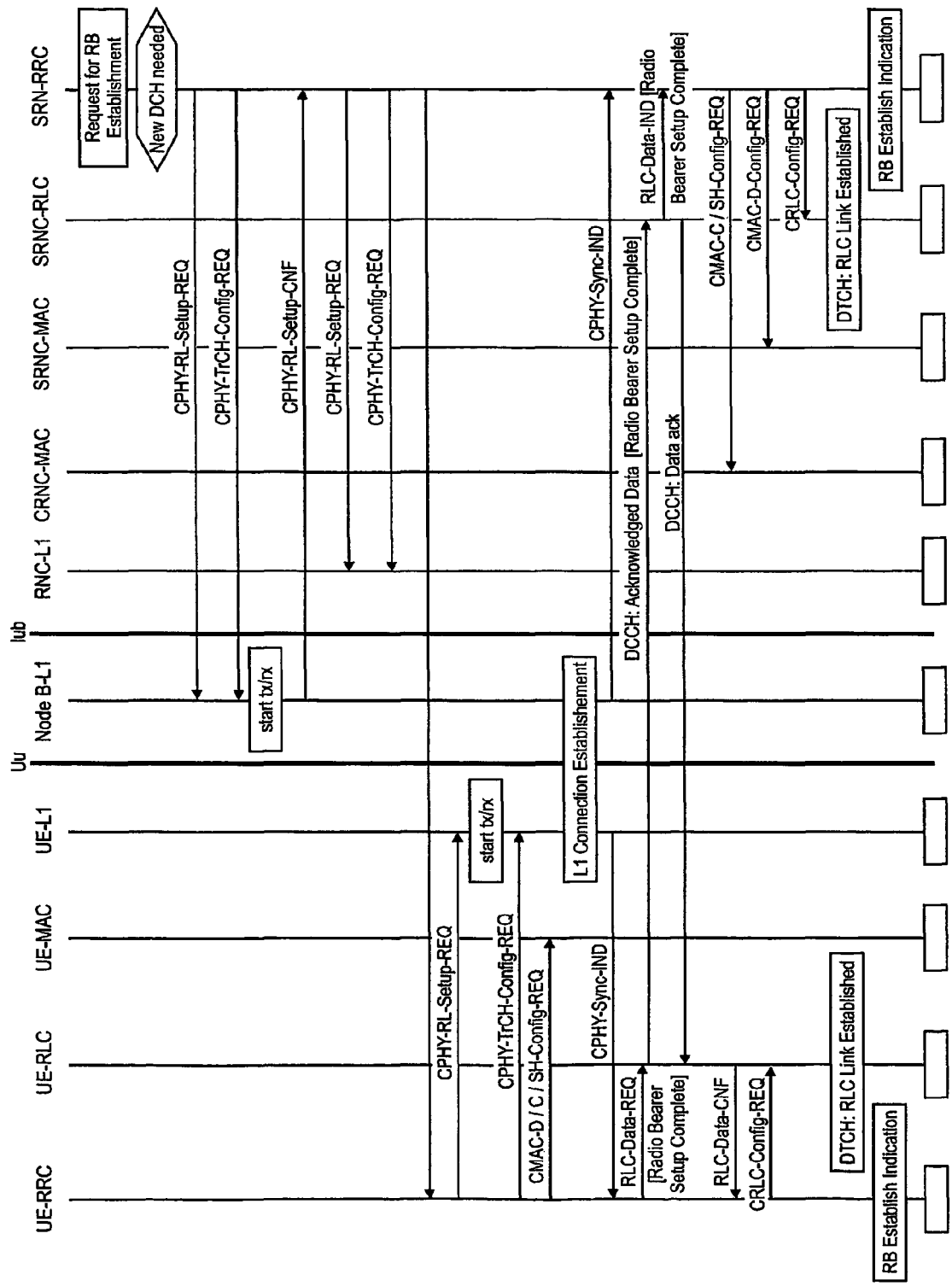
FIG. 10 shows a setup procedure of a radio bearer according to the UMTS specifications.

Therefore in another embodiment, the timer value may be known to the UE e.g. it may be predetermined. In another embodiment of the invention, the timer value is signaled to the UE. The timer value may be signaled using RRC signaling. This may require the definition of a new information element, e.g. called HARQ_flush_timer, for an RRC signaling message. The bearer setup procedure as described in FIG. 10 would not need to be changed and would incorporate the new information element HARQ_flush_timer in the existing message such as RB_setup, RB_reconfiguration, RRC_connection_setup, TrCH_reconfiguration, cell_update or a handover_command. If the HARQ timer value is not signaled it may have a predetermined default value. Furthermore the granularity of the timer values may increase with higher values of the parameter HARQ_flush_timer. For example when assuming possible timer values of 5 ms, 10 ms, 15 ms, 20 ms, 30 ms, 50 ms or 100 ms, the HARQ_flush_timer could be represented by 3 bits.

Furthermore, the communication terminal may change the selection of transmission parameters assuming it knows that the soft buffer has already been flushed in some or all Node Bs. There are for instance different strategies for incremental redundancy depending on how many retransmissions have already been sent. Some UEs send a low code rate at the initial data packet to come close to the code rate needed for decoding. In further retransmission data packets only little redundancy is added. If it is known that a buffer region associated with a data packet and related retransmission data packets has been flushed in some or all Node Bs, the UE can again start from initial transmission. The same could apply for systems using different modulation constellations in the different transmissions such as constellation rearrangement. (see for example 3GPP TS 25.213: "Spreading and modulation (FDD)", available at http://.www.3gpp.org).

Figure 12:
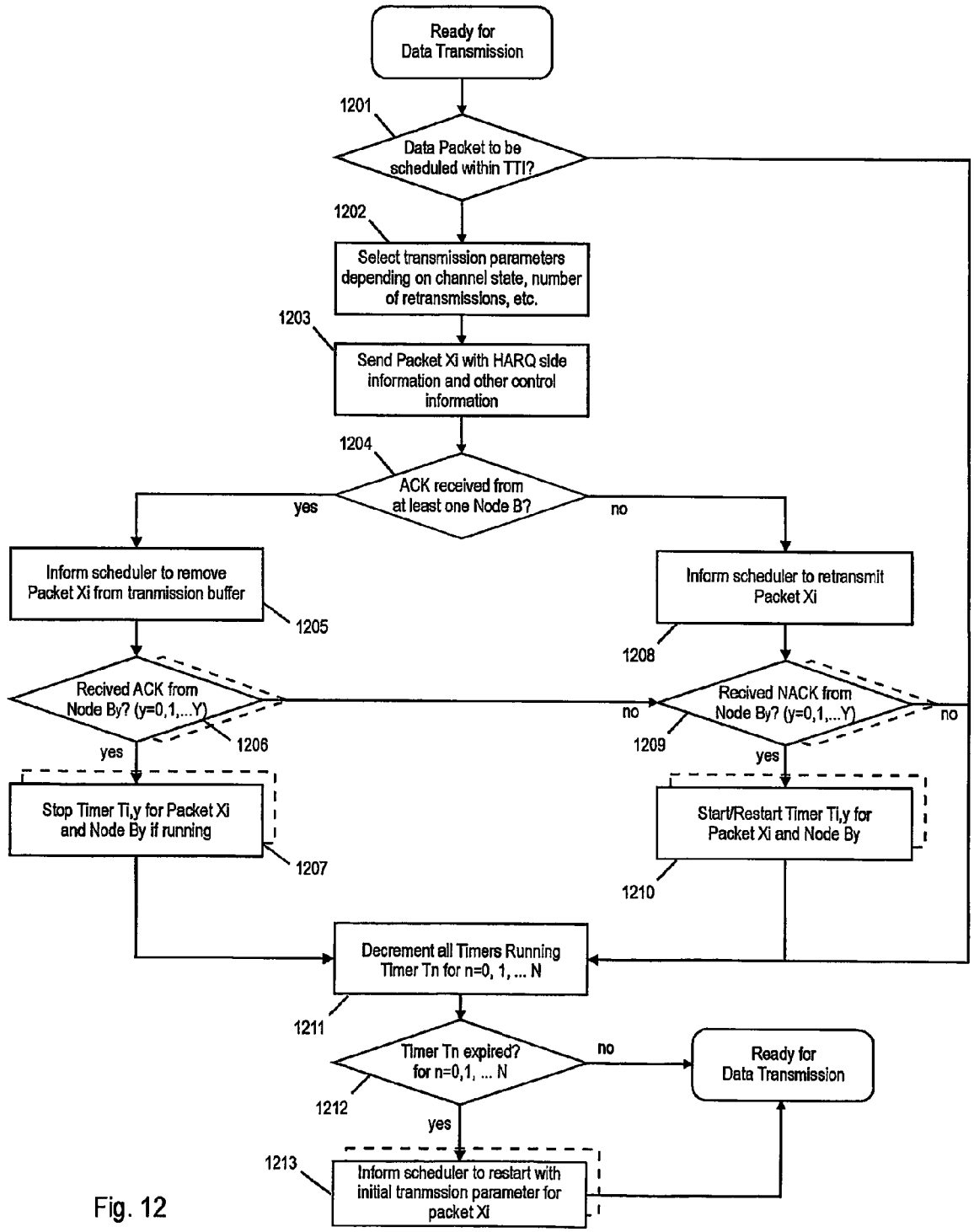
FIG. 12 shows a flow chart of the operation of a communication terminal according to an embodiment of the present invention.

In FIG. 12 an exemplary HARQ transmitter operation is shown. The UE may be ready for data transmission if the UE is synchronized, the radio bearer has been configured correctly by RRC etc. If the UE is allowed to transmit, has data in its transmission buffer, sufficient transmit power etc. it may transmit one or more packets within a TTI as indicated by block 1201. A packet is usually called Packet Data Unit and may be a segment of another packet such as an IP packet or may also be a concatenation of multiple packets. In step 1202 the UE may select the transmission parameter such as transport block size, modulation and coding scheme, number of codes, power, constellation etc. and may send this side information or control information before or along with the packet that is being transmitted in step 1203.

There are many alternatives how the feedback message is generated and processed. In this example all Node Bs send feedback and if one of the Node B sends an ACK (see step 1204) the packet is considered as being correctly received and may be removed from the transmitter buffer (see step 105). Next, for each Node By within the active set it may be checked whether an acknowledgement for the transmitted packet has been received in step 1206. In case a ACK has been received for a particular packet $X_i$ the corresponding timer $T_{i,y}$ is stopped in step 1207. If no ACK from a base station has been received the process advances to block 1209. The steps that may be executed by all Node Bs in the active set (y=0,1 ... Y) which is indicated in the figure by multiple shapes. This implies that there may be as many timers in the UE as there are Node Bs in the active set.

In case no ACK has been received for a the transmitted packet $X_i$, the packet may be scheduled for a retransmission in step 1208. The problem of non-synchronized soft buffer may occur when a new data packet is transmitted which is different from the one that is still stored in the soft buffer, i.e. a previously transmitted data packet. Since the Node B may not know when is has missed a transmission, the timer is started after each reception.

In step 1210 the UE may start or restart the timers for every packet and each Node B within the active set for which a negative acknowledgement NAK is received (see step 1209). If a Node B has missed the packet (neither ACK nor NAK is transmitted), the timer will not be affected and the procedure advances to block 1211.

The timer may preferably be set to a multiple value of the TTI and will be decremented each TTI in step 1211.

If a timer expires at a Node B (see step 1212), the UE may know that the respective timer expired at that particular Node B and the soft buffer for that packet was flushed at that particular Node B (see step 1213). In the illustrated embodiment the UE may send a possible retransmission, i.e. an initial data packet in this case, with the initial parameter settings. If nothing has been scheduled within a TTI all timer will be decremented as well by one TTI. The decision in the UE to restart with initial transmission parameter may depend on other parameters or conditions such as at how many Node Bs the buffer was flushed, on how many retransmissions have already been sent, on how much the channel conditions already changed in the meantime, etc.

It is further noted that only one selected Node B of the active set may send a feedback message to the UE to indicate the reception state (ACK, NAK) of a transmitted data packet/retransmission data packet. In the latter case, only one timer for each transmitted data packet may be maintained. In this case it needs to be mentioned that it may not be ensured that the soft buffer of the other Node Bs not sending feedback are still always fully synchronized. In that situation it may be beneficial to use the invention as outlined above or soft buffer synchronization by signaling among the active sets Node Bs, as outlined in the copending application Ser. No. 10/568,083 "Base Station synchronization in Soft Handover", filed on the same date as the present application.

In the following other actions that may be performed by the UE are outlined. These are mainly actions that avoid that the Node B flushes the buffer region for a particular associated data packet retransmission process. Therefore the UE timer has to be set to a value less then the Node B timer to trigger that action well in time, i.e. to be able to send e.g. a retransmission data packet arriving at the Node B before time expiry.

If the UE is in a scheduled mode it needs to transmit capacity request message to the Node B. These capacity request may contain different attributes to support the Node B in making the scheduling decision. Such parameters could be for instance the priority of the transmission, amount of data in the buffer as well as the time that is available until the packet must be transmitted. In another aspect of the invention the UE considers the timer for the generation of the UL capacity request as well as for the setting of parameters which will be sent within the capacity request.

It has been outlined that the timer may be calculated according to the worst case assuming continuous transmission of data packets from the UE and an immediate reuse of the same HARQ process and sequence number by a new data packet. This is in order to avoid erroneous combining of soft buffer values of a packet by all means. On the other hand such a case may only rarely occur in reality and it is more likely that soft buffer values are cleared from time to time although there may still be a somewhat delayed retransmission coming. In another embodiment of the present invention the timer may be set to a larger value than in the described worst case scenario. In that case the UE has to prevent erroneous combining in extreme situations close to the worst case by appropriate actions as outlined below.

Depending on the feedback scheme the UE is aware of some or all Node Bs' HARQ contexts i.e. state of the different processes or the ARQ window, the timer, the soft buffer consumption etc.. If the ACK/NAK is sent by all Node Bs the UE may know due to a missing ACK/NAK that the Node B has most likely missed a certain packet. If this was an initial transmission it is clear that the Node B's soft buffer has not been updated and is hence not synchronized to the buffers of the other Node Bs that have sent feedback. The UE may thus predict when an error situation can potentially occur and avoid that case.

Since the error case only happens if a new packet is transmitted the transmitter can use a different HARQ process and/or sequence number (or NDI) for the new packet and thus avoid a potentially wrong combining. If soft buffer storage space is limited there must be a HARQ process and/or sequence number (or NDI) value available, which is not in the state of processing or having values stored for combining. If the whole soft buffer is in use the respective retransmission process may be stalled until an ACK for another packet in the soft buffer is received and that HARQ process and/or sequence number (NDI) may be reused. It may also stall the HARQ process until the timer expires and restart with the same packet. In general it should be avoided that the UE has to wait until the timer in the Node B expires in order to reduce latency. Nevertheless, there may still be special cases, depending on the data packet retransmission scheme design, for which the expiry of the timer is desirable. Instead of waiting for the expiry of the timer in the Node B the UE may itself initiate a partial or full of a soft buffer region in the Node B. This may for instance be done by using e.g. a flush indicator, by forwarding the HARQ window artificially, which is equivalent to a flush of a part of the whole buffer or by simply aborting some packets which have not been acknowledged.

If the UE is not able to retransmit packets, e.g. the transmit power is not sufficient, scheduling the retransmission in time is not possible, etc., it may signal this to the Node B in order to avoid a flushing of the soft buffer. This could for instance be done by a flag along with the other HARQ related control information such as HARQ process number and sequence number (or NDI). A special restart request message comprising the flag may be sent by the UE to instruct a Node B to restart a particular running timer. Upon reception the Node B will stop or preferably restart the timer for that packet and will maintain the soft buffer. Another possibility would be a kind of zero payload packet with certain control information, but with a transport block size of zero. That means that there is not real data transmitted. Although this transmission will consume some resources it may be more radio efficient then flushing the soft buffer which may have gathered almost enough redundancy for successful decoding.

As outlined above, according to an embodiment of the present invention it is desirable if a single Node B sends feedback messages to the UE to acknowledge a received data packet. Hence, the selection of the so called serving Node B may require further considerations in order to provide reliable feedback to the UE. Possible selection criteria related to radio link quality indicators, for the selection of a serving Node B are outlined in the copending application Ser. No. 10/567,607 "Serving Base Station selection during Soft Handover", filed on the same date as the present application.

The fact that a timer used for synchronization of soft buffer contents is near its expiry may be interpreted as deterioration of uplink radio link conditions of that particular Node B. The signaling of this information to support serving Node B reselection depends on the UTRAN architecture that is considered. For the R99/4/5 architecture, the information may be signaled from the current serving Node B to the RNC. For the evolved architecture, however, radio-related protocol entities may be located in Node B+s. It may be up to the current serving Node B+ to select new serving Node B+ and signal the decision to it. Therefore, in this case the fact that the timer in the current serving Node B+ is near its expiry may not have to be signaled to another network elements.

In the copending application the negotiation of activation time for serving Node B selection has been defined. A possible interaction with the present application would be to consider the status of the timer for soft buffer synchronization before proposing new activation time. Depending on the radio access network architecture, the actual deployment, the transport technology etc. there may be different delays on Iub/Iur interfaces. Depending on these delays it may be beneficial to use the invention as outlined above or soft buffer synchronization by signaling among the active sets Node Bs, as outlined in the copending application Ser. No. 10/568,083 "Base Station synchronization during Soft Handover", filed on the same date as the present application. For short signaling delays within the network (e.g. all Node Bs part of the same cluster or Radio Network Subsystem) it may be beneficial to use a synchronization method as described in the copending application while for longer delays the present invention may be preferred. Both method could also be applied in parallel and depending. If the signaling is arrived the timer will be superseded or vice versa.

Another embodiment provides an alternative solution of the object of the present invention as stated above. If a packet is stored in the Node B and the Node B receives no retransmission for some time, it does not know if it has missed the retransmission, which perhaps was received correctly by another Node B or if there was really nothing send in the uplink.

If there are no errors in the downlink feedback signalling the UE knows its transmission state (HARQ context) of each Node B exactly. Even if some Node Bs missed some retransmissions completely, it will be known to the UE based on the missing feedback of those UEs.

In this embodiment, an additional flag indicating whether to combine the received data packet with previous transmissions may be used. If a packet which is still stored in the soft buffer has not been scheduled in the meantime or has not been acknowledged by any of the Node Bs a combine indicator may be set by the UE to indicate to a Node B that the packet can still be combined. This will give a Node B the guarantee that the packet can still be combined. For an initial transmission of a new data packet the combine indicator may indicate that the received packet is not to be combined with previous data packets received and the Node B may flush a buffer region corresponding to the process number signalled with the current received data packet. An advantageous combination with the flush timer may also be possible. If the timer has expired and a packet is received with a not set combine indicator the packet will be discarded.

If during a pending retransmission the channel conditions have been changed in the mean time it may also be beneficial to change the transmission format of the packet. This implies that not combing will be possible. In that case the flush bit could be set although the same packet with the same sequence number is sent. The receiver may flush the HARQ buffer although a packet with the same sequence number (of process number and NDI) is still being buffered. One advantage compared to incrementing the sequence number is that there is no packet missing in the reordering buffer.

For fast cell cite selection the problems arising are similar to those in the introduction of this application. In contrast there may be no soft handover for a UE, but a fast switch between different cells.

In a further embodiment of the present application the principles underlying the present invention as outlined above may be also applied to HARQ soft buffer synchronisation during fast cell site selection (FCS). Using fast cell cite selection the UE always transmits to a single cell preferable the cell with best channel characteristics or the lowest load (no soft handover transmission). Depending on the detailed protocol the UE may switch between cells within a specific time or each TTI. The cell switch may be done autonomously by the UE or may be fully or partly controlled by the network. In the same way as in soft handover the soft buffer may need to be synchronised before the next transmission may arrive at the same Node B. For FCS the time available for synchronisation may consider a switch from this cell and back to this cell. The same further embodiment may apply if there are different scheduling modes, whereas one mode may be characterized by the support HARQ while the other may not. If the UE is in scheduled mode it may not support HARQ while it is in autonomous mode it may support such functionality. One of the reasons for this may be that for scheduled mode more control information needs to be signalled between the UE and the Node B. This could be combined with control information required for HARQ operation. When switching back and forth the soft buffer may be synchronised as well.

The RNC may not be aware of a mode switch or a cell switch performed by Node B and mobile terminal. As soon as the RNC, serving as a reordering entity, receives packets from a new Node B it may inform the previous or all other Node Bs in the active set to flush their soft buffer. Alternatively the new Node B may know if a cell switch has been performed and can inform the old or the other Node Bs about it. The other Node Bs may flush their buffer accordingly. The Node B which is aware of the mode or cell switch could also inform the RNC in Rel99/4/5 architecture or the current Serving Node B+ in the evolved architecture about this event. The RNC or the Serving Node B+ may also inform the other Node Bs of the active set to flush their buffer accordingly. If cell and mode selection is done on a slow basis and not packet per packet the soft buffer may be synchronised before a cell or mode switch back to the previous cell or mode can happen.

As previously discussed there may be the drawback that soft buffer values are flushed although retransmission may still arrive. If FCS or mode switches are done on a very fast basis e.g. per TTI there may be a high likelihood that a reselection of the same cell or mode occurs frequently. In that case it may be beneficial to keep the soft buffer values for a potential switch back to the cell or mode for some period of time. This will allow for a combining of retransmissions with previous transmissions that are already buffered in the soft buffer. It may also happen that the communication terminal or mobile terminal does not transmit any data after the switch to a new cell or new mode. In that case it may be decided to switch back to the previous cell or mode and to continue transmission with the same state of the associated buffer region. The period of time until a flush will be done may again be defined by a threshold time period whereas at least one of the base stations and the communication terminal may be monitoring the time elapsed since the storage of said data packet in said associated buffer region. The threshold time period may be calculated in a similar manner as described before maybe considering an additional cell or mode switching time. There may again be a tradeoff between the minimum length of the threshold time period and the gain from soft combining. Erroneous combining may be prevented by the described method or by a combination with other methods. The described threshold time period for FCS or a mode switch may be the same or different from the threshold time period for the soft handover i.e. the plurality of base stations. If the value is different it may also be signaled to at least one of the respective base stations by radio network control signaling and the communication terminal via radio resource signaling in a similar manner as described before.

Figure 1:
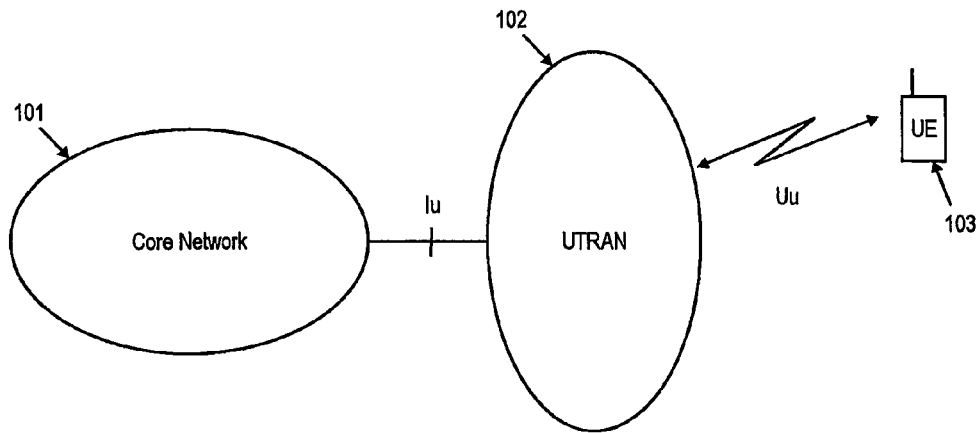
FIG. 1 shows the high-level architecture of UMTS.
Figure 2:
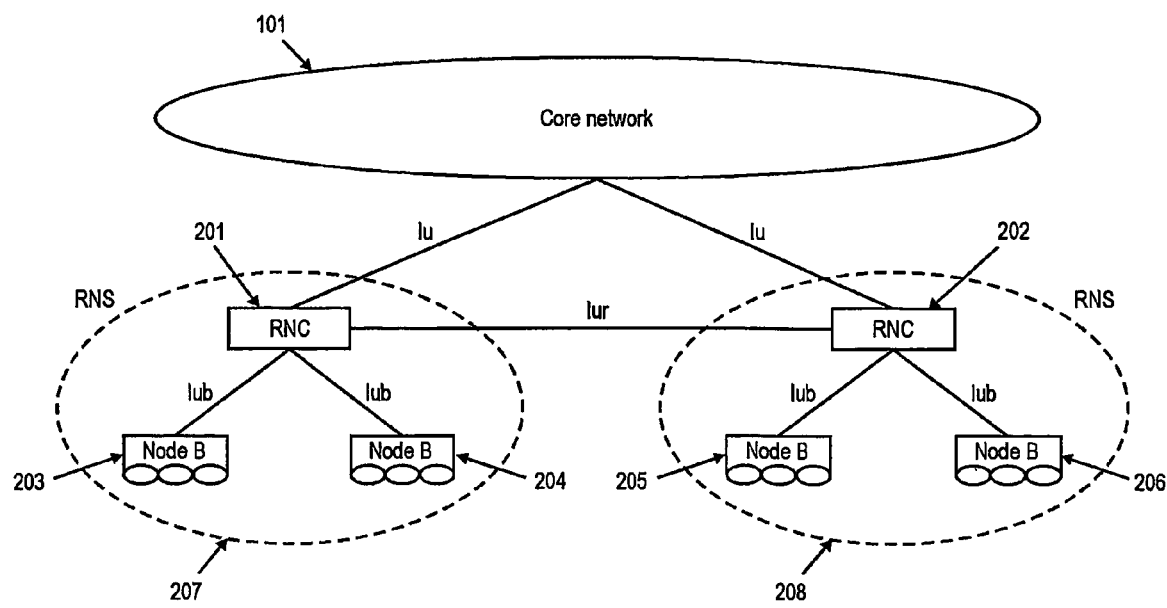
FIG. 2 shows the architecture of the UTRAN according to UMTS R99/4/5.
Figure 3:
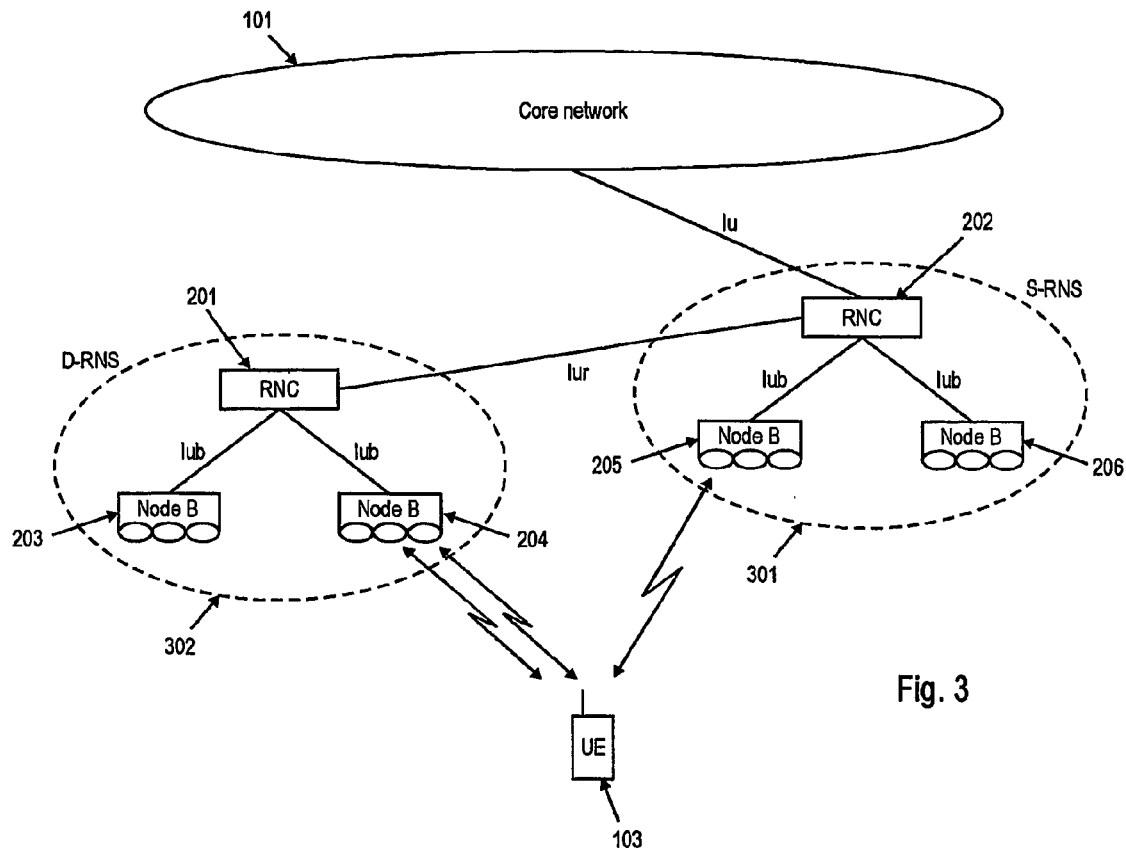
FIG. 3 shows a Drift and a Serving Radio Subsystem.
Figure 4:
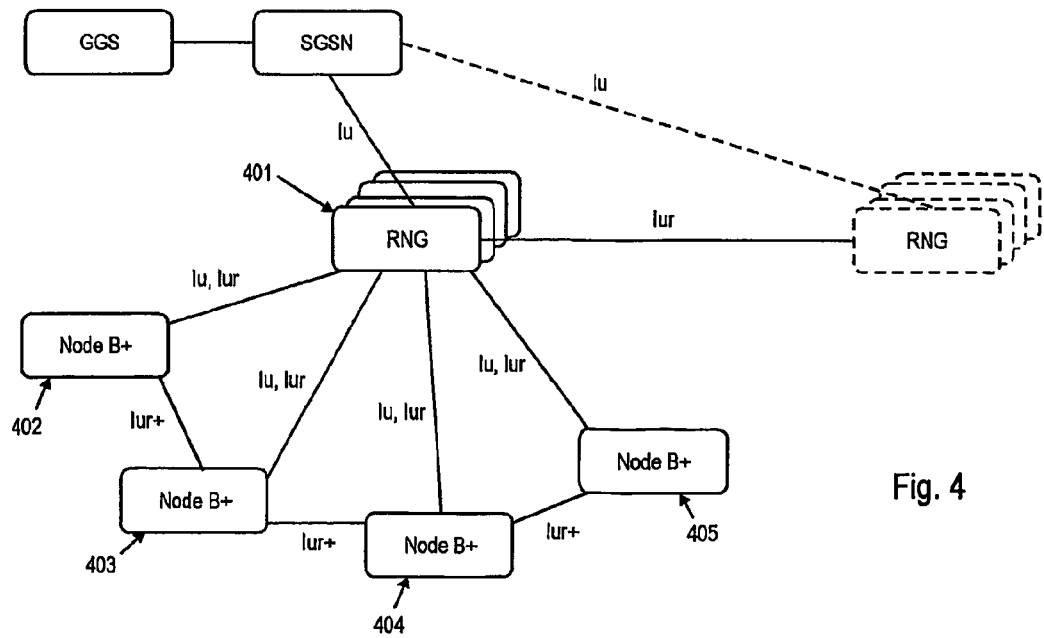
FIG. 4 shows the evolved UTRAN architecture.
Figure 5:
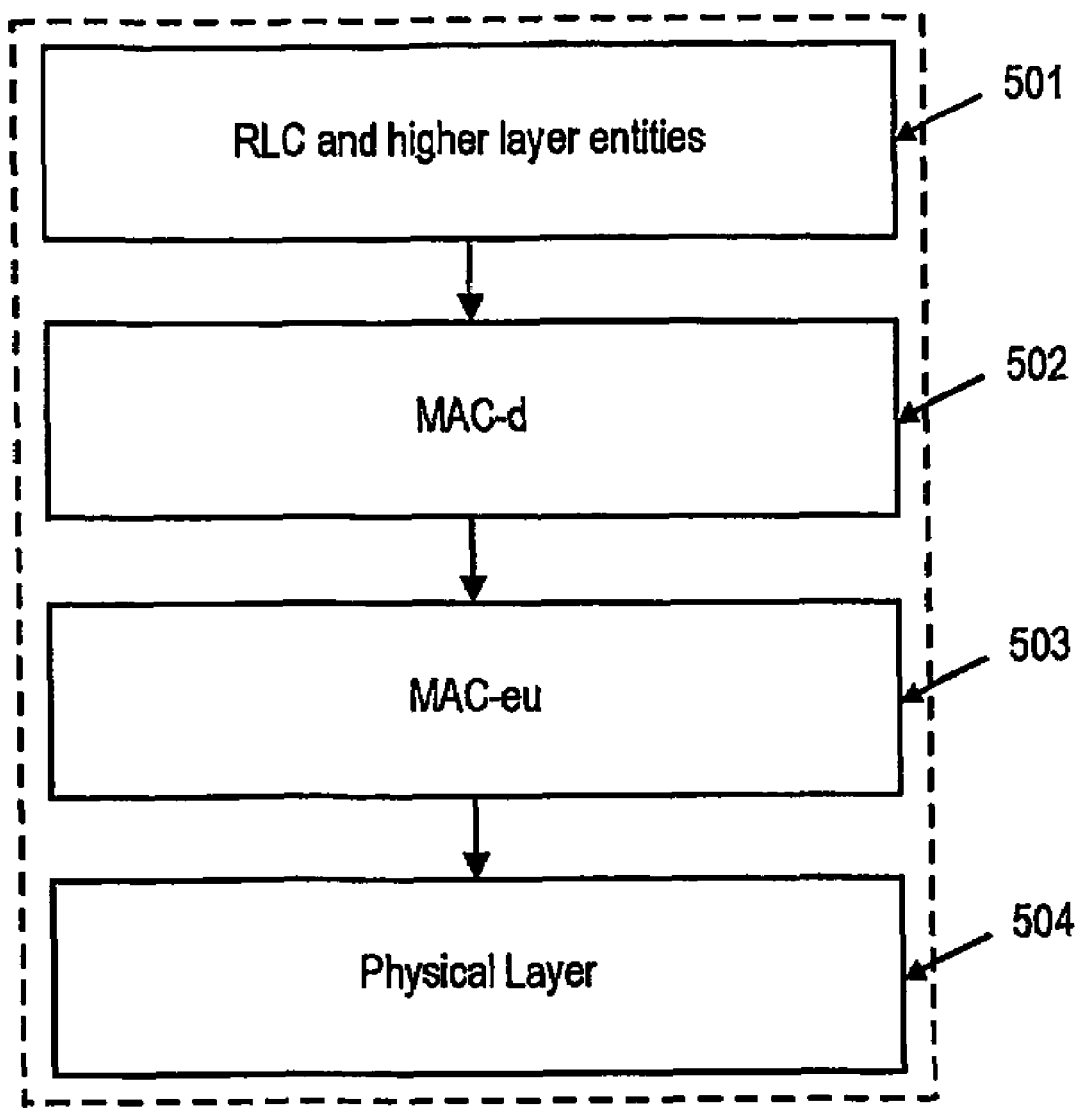
FIG. 5 shows the E-DCH MAC architecture at a UE.
Figure 6:
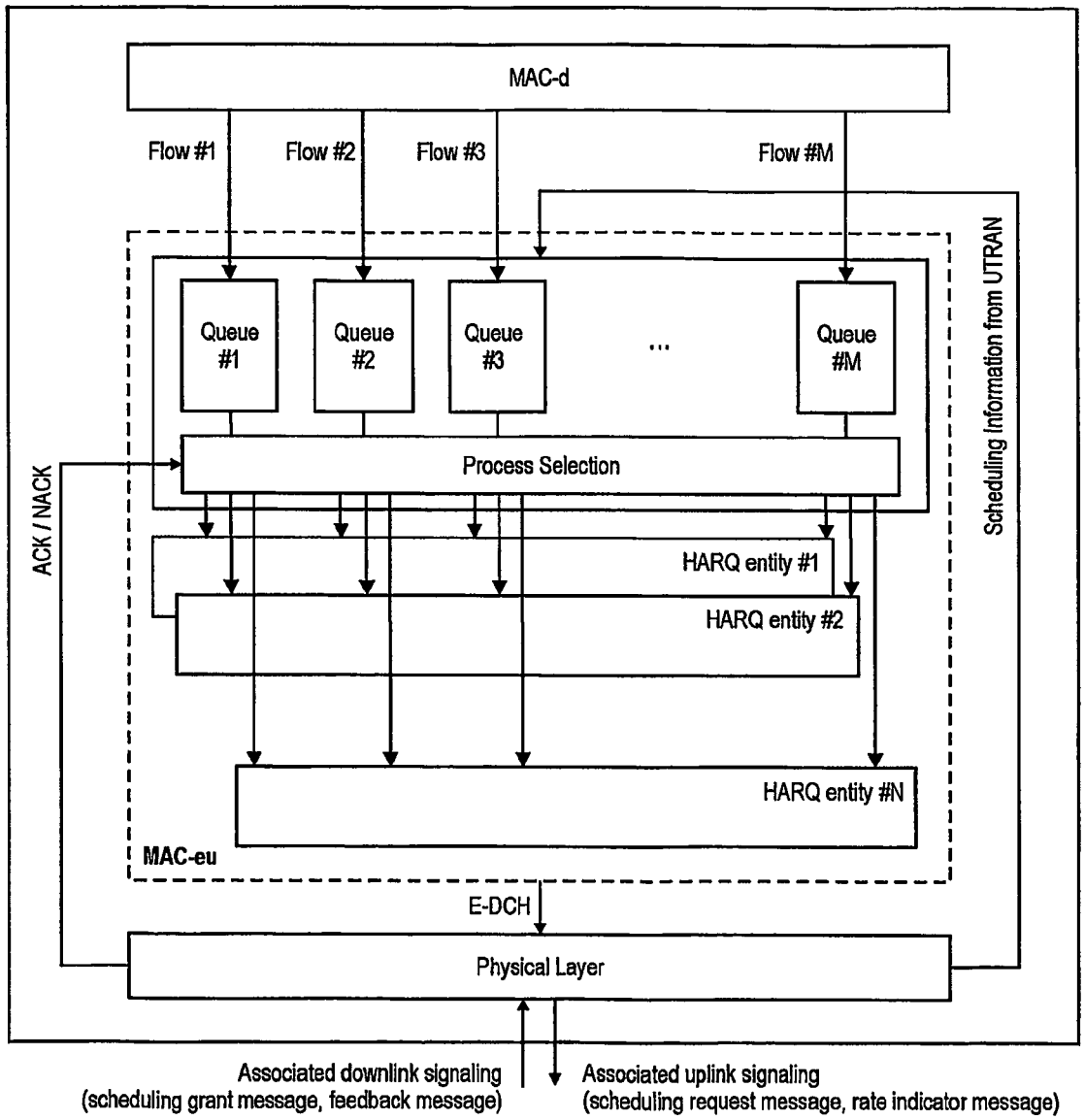
FIG. 6 shows the MAC-eu architecture at a UE.
Figure 7:
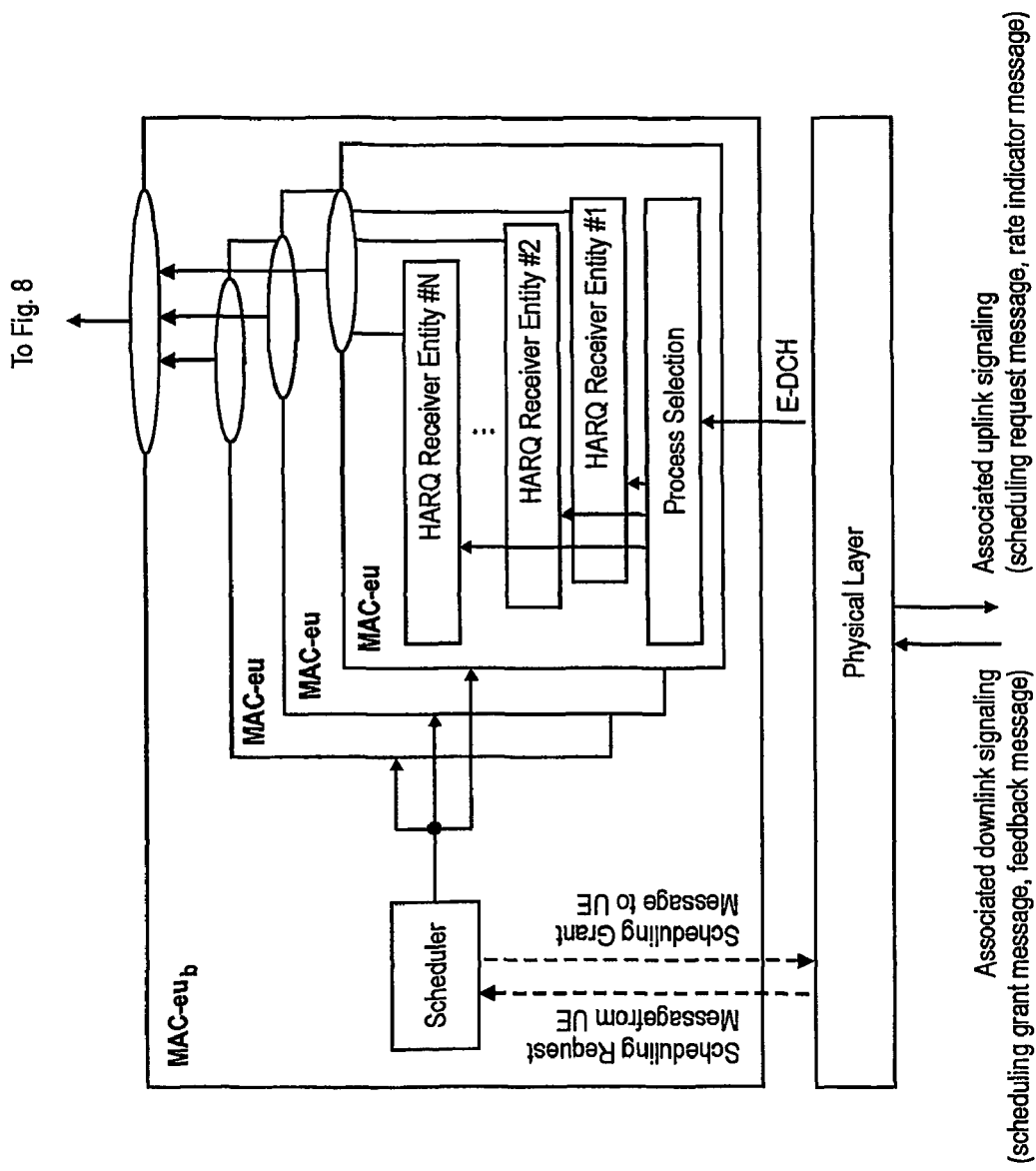
FIG. 7 shows the MAC-eu architecture at a Node B.
Figure 8:
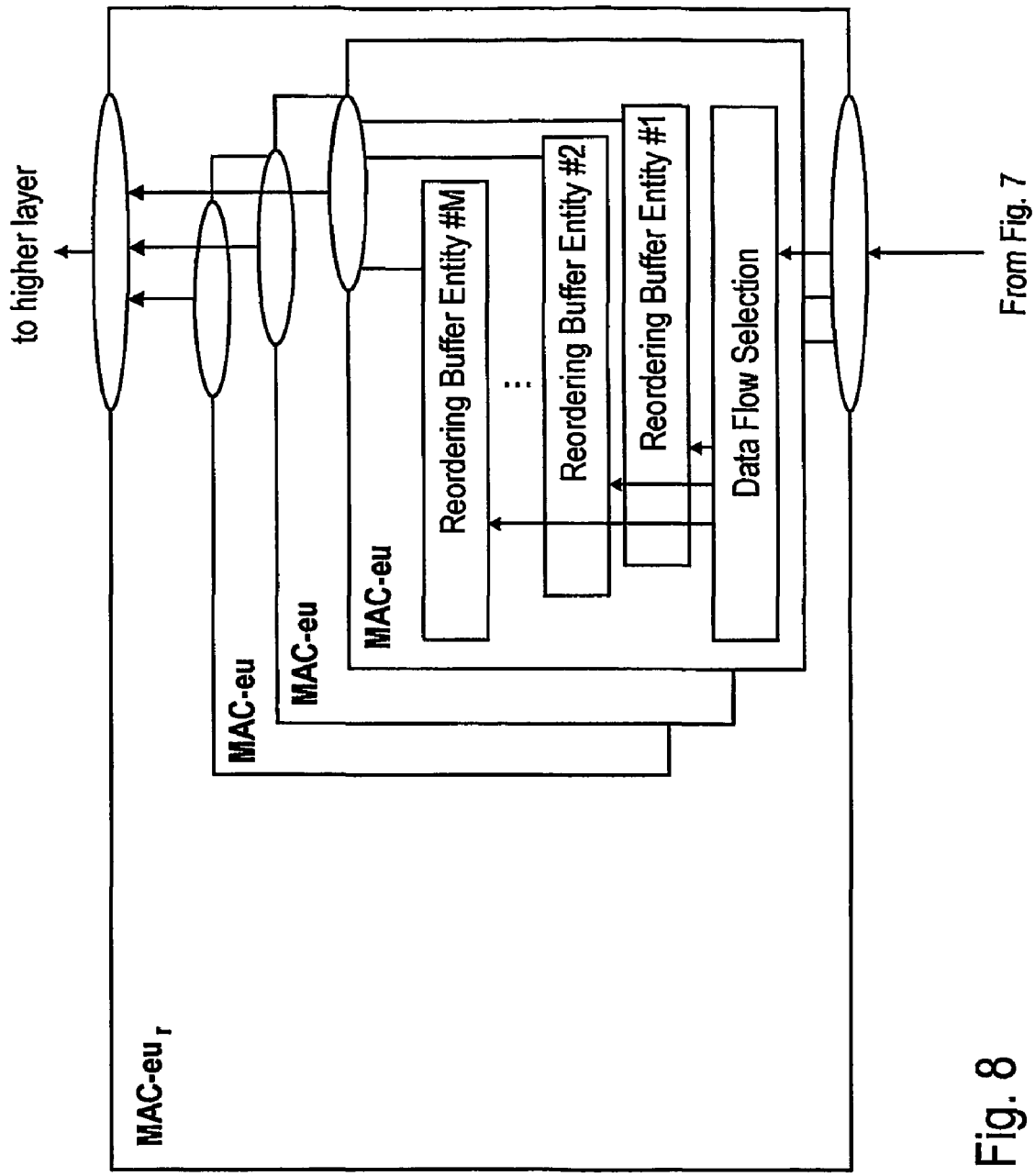
FIG. 8 shows the MAC-eu architecture at a RNC.

Finally, it is noted that the present invention described above may be used for different types of RAN architectures. E.g. the present invention is applicable to the UTMS R99/4/5 UTRAN architecture as illustrated in FIG. 2 as well as the evolved UTRAN architecture as illustrated in FIG. 4.

The invention claimed is:

1. A method for avoiding soft buffer corruption in a Hybrid Automatic Repeat reQuest (HARQ) protocol in a mobile communication system comprising a communication terminal and a plurality of base stations, wherein said communication terminal is in communication with said plurality of base stations during a soft handover, the method comprising:
   receiving data from the communication terminal in a soft handover by at least one of the base stations employing one of plural HARQ processes of the HARQ protocol, wherein said communication terminal is in communication with said plurality of base stations during the soft handover,
   storing said received data in a soft buffer region of a HARQ soft buffer of said at least one of the base stations, wherein the soft buffer region is associated to the HARQ process employed to receive the data,
   decoding by said at least one of the base stations the data stored in said soft buffer region associated to the HARQ process employed to receive the data, and
   employing an elapsed time since storing said data in the soft buffer region associated to the HARQ process employed to receive the data to flush by said at least one base station the soft buffer region associated to the HARQ process employed to receive the data, whereby soft buffer corruption is avoided.

2. The method for receiving data according to claim 1, wherein the data is stored in the soft buffer region of the HARQ soft buffer in order to be combined with a retransmitted data, if the received data is not decoded successfully.

3. The method for receiving data according to claim 1 or 2, further comprising flushing the soft buffer region, associated to the HARQ process employed to receive the data, based on the elapsed time.

4. The method according to claim 3, wherein the at least one base station flushes said soft buffer region associated to the HARQ process employed to receive the data, if the received data is decoded successfully.

5. The method according to claim 4, wherein the soft buffer region associated to the HARQ process employed to receive the data is flushed, if the elapsed time is equal to or larger than a threshold time period.

6. The method according to claim 3, wherein the soft buffer region associated to the HARQ process employed to receive the data is flushed, if the elapsed time is equal to or larger than a threshold time period.

7. The method according to claim 6, wherein the threshold time period is defined as a period after which a retransmission data can no longer be expected in the base station.

8. The method according to claim 6, wherein said threshold time period is of configurable duration.

9. The method according to claim 8, further comprising signaling the duration of said threshold time period to said at least one of the base stations by radio network control signaling from a control unit in the mobile communication network.

10. The method according to claim 9, wherein the duration of said threshold time period is signaled to said at least one of the base stations in an information element of a Node B Application Protocol (NBAP) message.

11. The method according to claim 8, further comprising signaling the duration of said threshold time period to said communication terminal by radio resource control signaling from a control unit in the mobile communication network.

12. The method according to claim 11, wherein the duration of said threshold time period is signaled to the communication terminal in an Information Element (IE) of at least one of a radio bearer setup message, a radio bearer reconfiguration message, a radio resource control connection setup message, a transport channel reconfiguration message, a cell update message, and a handover command message.

13. The method according to claim 6, wherein said HARQ protocol is a window-based HARQ protocol, and the method further comprises calculating said threshold time period based on the time required for the transmission of all data within a window of the HARQ protocol.

14. The method according to claim 6, further comprising calculating said threshold time period based on the time interval between the reception of an initial data and the reception of a retransmission data.

15. The method according to claim 6, further comprising calculating the duration of said threshold time period based on the size of said soft buffer, a maximum number of retransmissions in the HARQ protocol, a communication terminal's processing time for a feedback message, a respective base station's processing time for a received data and a transmission time interval.

16. The method according to claim 1, further comprising:
receiving retransmission data from the communication terminal by at least one of the base stations employing said one of the HARQ processes,
storing said received retransmission data in a soft buffer region associated to said one of the HARQ processes,
decoding the data stored in the soft buffer region associated to said one of the HARQ processes, and
restarting timing of the elapsed time.

17. The method according to claim 1, further comprising:
receiving retransmission data from the communication terminal by at least of the base stations employing said one of the HARQ processes,
storing said received retransmission data in a soft buffer region associated to said one of the HARQ processes,
decoding the data stored in the soft buffer region associated to said one of the HARQ processes, and
stopping timing of the elapsed time if the decoding is successful.

18. The method according to claim 1, further comprising:
receiving retransmission data from the communication terminal by at least one of the base stations employing said one of the HARQ processes,
combining received retransmission data with the previously received data in said one of the HARQ processes to produce a combined data,
restarting timing of the elapsed time, and
decoding the combined data.

19. The method according to claim 1, further comprising stopping the timing of the elapsed time if the elapsed time is equal to or larger than a threshold time period.

20. The method according to claim 19, wherein said threshold time period is of configurable duration.

21. The method according to claim 19, wherein said HARQ protocol is a window-based HARQ protocol, and the method further comprises calculating said threshold time period based on the time required for the transmission of all data within a window of the HARQ protocol.

22. The method according to claim 19, further comprising calculating said threshold time period based on the time interval between the reception of an initial data and the reception of a retransmission data.

23. The method according to claim 19, further comprising calculating the duration of said threshold time period based on the size of said soft buffer, a maximum number of retransmissions in the HARQ protocol a communication terminal's processing time for a feedback message, a respective base station's processing time for a received data and a transmission time interval.

24. The method according to claim 1, further comprising transmitting a message from at least one of the base stations to the communication terminal indicating whether said at least one of the base stations decoded said received data successively.

25. The method according to claim 1, further comprising forwarding the received data to a control unit of the mobile communication system by one of said at least one of the base stations that did decode the received data successively.

26. The method according to claim 1, further comprising receiving a capacity request message from said communication terminal by at least one of the base stations requesting additional transmission capacity for a retransmission data.

27. The method according to claim 26, wherein said capacity request message comprises at least one of a transmission priority of data to be transmitted by said communication terminal, a size of data in a transmission buffer of said communication terminal, a duration of said elapsed time, an identification of data, or a channel for which capacity is requested.

28. The method according to claim 26 or 27, further comprising transmitting a capacity grant message from said at least one of the base stations to said communication terminal, wherein the capacity grant message indicates a transmission capacity assigned to said communication terminal for data transmission.

29. The method according to claim 1, wherein the data is received via a dedicated channel.

30. The method according to claim 1, further comprising receiving a restart request message from said communication terminal by at least one of the base stations, wherein said restart request message indicates data for which the elapsed time has to be restarted.

31. The method according to claim 30, wherein said restart request message comprises control information and no payload data or dummy payload data.

32. A base station for avoiding soft buffer corruption in a Hybrid Automatic Repeat reQuest (HARQ) protocol, wherein the base station is part of a mobile communication system that comprises a communication terminal and a plurality of base stations including said base station, wherein said communication terminal is in communication with said plurality of base stations during a soft handover, the base station comprising:

a receiving section that receives data from the communication terminal employing one of plural HARQ processes of the HARQ protocol, a soft buffer that stores data received employing one of the plural HARQ processes in a soft buffer region associated to the respective HARQ process, and a decoding section that decodes said data received employing one of the plural HARQ processes and being stored in the associated soft buffer region, wherein the base station employs an elapsed time since storing said received data in the soft buffer region associated to the HARQ process employed to receive the data to flush the soft buffer region associated to the HARQ process employed to receive the data, whereby soft buffer corruption is avoided.

33. The base station according to claim 32, wherein the base station is operable to store the received data in the associated soft buffer region in order to be combined with retransmitted data if the received data is not decoded successfully.

34. The base station according to claim 32 or 33, wherein the base station is operable to flush the soft buffer if said received data is decoded successfully.

35. The base station according to claim 32, wherein the base station is operable to flush the soft buffer region associated to the HARQ process employed to receive the data if the elapsed time is equal to or larger than a threshold time period.

36. The base station according to claim 35, wherein the threshold time period is defined as a period after which a retransmission data can no longer be expected in the base station.

37. The base station according to claim 32, wherein the receiving section is operable to receive retransmission data from the communication terminal employing said one of the HARQ processes, the soft buffer is operable to store said received retransmission data in the soft buffer region associated to said one of the HARQ processes, and the decoding section is operable to decode the data stored in the soft buffer region associated to said one of the HARQ processes, and wherein the base station is operable to restart timing of the elapsed time.

38. The base station according to claim 32, wherein the receiving section is operable to receive retransmission data from the communication terminal employing said one of the HARQ processes, the soft buffer is operable to store said received retransmission data in the soft buffer region associated to said one of the HARQ processes, and the decoding section is operable to decode the data stored in the soft buffer region associated to said one of to HARQ processes, wherein the base station is operable to stop timing of the elapsed time if the received transmission data is decoded successfully.

39. The base station according to claim 32, wherein the base station is operable to combine a retransmission data with the previously received data to produce a combined data, and the decoding section decodes the combined data.

40. The base station according to claim 32, wherein the base station is operable to stop to elapsed time if the elapsed time is equal to or larger than a threshold time period.

* * * * *